United States Patent
Chakrabartty et al.

(10) Patent No.: US 11,853,878 B2
(45) Date of Patent: Dec. 26, 2023

(54) LARGE-SCALE NETWORKS OF GROWTH TRANSFORM NEURONS

(71) Applicants: Shantanu Chakrabartty, St. Louis, MO (US); Ahana Gangopadhyay, St. Louis, MO (US)

(72) Inventors: Shantanu Chakrabartty, St. Louis, MO (US); Ahana Gangopadhyay, St. Louis, MO (US)

(73) Assignee: Washington University, St. Louis, MO (US)

( * ) Notice: Subject to any disclaimer, the term of this patent is extended or adjusted under 35 U.S.C. 154(b) by 693 days.

(21) Appl. No.: 16/462,805

(22) PCT Filed: Nov. 22, 2017

(86) PCT No.: PCT/US2017/062986
§ 371 (c)(1),
(2) Date: May 21, 2019

(87) PCT Pub. No.: WO2018/098257
PCT Pub. Date: May 31, 2018

(65) Prior Publication Data
US 2019/0370653 A1 Dec. 5, 2019

Related U.S. Application Data

(60) Provisional application No. 62/484,669, filed on Apr. 12, 2017, provisional application No. 62/425,372, filed on Nov. 22, 2016.

(51) Int. Cl.
*G06N 3/08* (2023.01)
*G06N 3/049* (2023.01)
*G06N 20/10* (2019.01)

(52) U.S. Cl.
CPC ............... *G06N 3/08* (2013.01); *G06N 3/049* (2013.01); *G06N 20/10* (2019.01)

(58) Field of Classification Search
CPC .......... G06N 3/08; G06N 3/049; G06N 20/10
See application file for complete search history.

(56) References Cited

U.S. PATENT DOCUMENTS 6,453,309 B1   9/2002   Kananen et al.
6,961,719 B1   11/2005  Rai
(Continued)

OTHER PUBLICATIONS

Shpigelman, Lavi, et al. "Spikernels: Embedding spiking neurons in inner-product spaces." Advances in neural information processing systems (2003): 141-148. (Year: 2003).*
International Search Report for International Application No. PCT/US2017/062986, dated Apr. 26, 2018, 1 page.
(Continued)

*Primary Examiner* — Brian M Smith
(74) *Attorney, Agent, or Firm* — Armstrong Teasdale LLP

(57) ABSTRACT

A growth transform neural network system is disclosed that includes a computing device with at least one processor and a memory storing a plurality of modules, including a growth transform neural network module, a growth transform module, and a network convergence module. The growth transform neural network module defines a plurality of mirrored neuron pairs that include a plurality of first components and a plurality of second components. Each first and second component is connected by a normalization link. The first components are interconnected according to an interconnection matrix, and the second components are interconnected according to the interconnection matrix. The growth transform module updates each first component of each mirrored neuron pair according to a growth transform neuron model. The network convergence module converges the plurality of mirrored neuron pairs to a steady state condition by solving a system objective function subject to at least one normalization constraint.

20 Claims, 31 Drawing Sheets

(56) References Cited

U.S. PATENT DOCUMENTS

| | | | | |
|---|---|---|---|---|
| 7,293,001 B1* | 11/2007 | Rai | .................... | G06N 3/0454 |
| | | | | 706/12 |
| 7,533,076 B2* | 5/2009 | Harris | ................ | G06K 9/6269 |
| | | | | 706/12 |
| 8,346,692 B2* | 1/2013 | Rouat | ................ | G06K 9/6212 |
| | | | | 706/20 |
| 8,874,496 B2 | 10/2014 | Lazar et al. | | |
| 9,082,075 B1* | 7/2015 | Cruz-Albrecht | ......... | G06N 3/02 |
| 2003/0065632 A1* | 4/2003 | Hubey | ................ | G06N 3/0436 |
| | | | | 706/15 |
| 2008/0183646 A1 | 7/2008 | Harris et al. | | |
| 2009/0287624 A1 | 11/2009 | Rouat et al. | | |

OTHER PUBLICATIONS

Written Opinion for International Application No. PCT/US2017/062986, dated Apr. 26, 2018, 6 pages.

Gangopadhyay and Chakrabartty, "Spiking, Bursting and Population Dynamics in a Network of Growth Transform Neurons", IEEE Transactions on Neural Networks and Learning Systems, 2018, pp. 2379-2391, vol. 29(6).

Chakrabartty and Cauwenberghs, "Gini Support Vector Machine: Quadratic Entropy Based Robust Multi-Class Probability Regression", Journal of Machine Learning Research, 2007, pp. 813-839, vol. 8.

Chakrabartty et al., "Hybrid Support Vector Machine / Hidden Markov Model approach for continuous speech recognition", Proceedings of the 43rd IEEE Midwest Symposium on Circuits and Systems, Aug. 8-11, 2000, pp. 828-831, Lansing, MI.

* cited by examiner

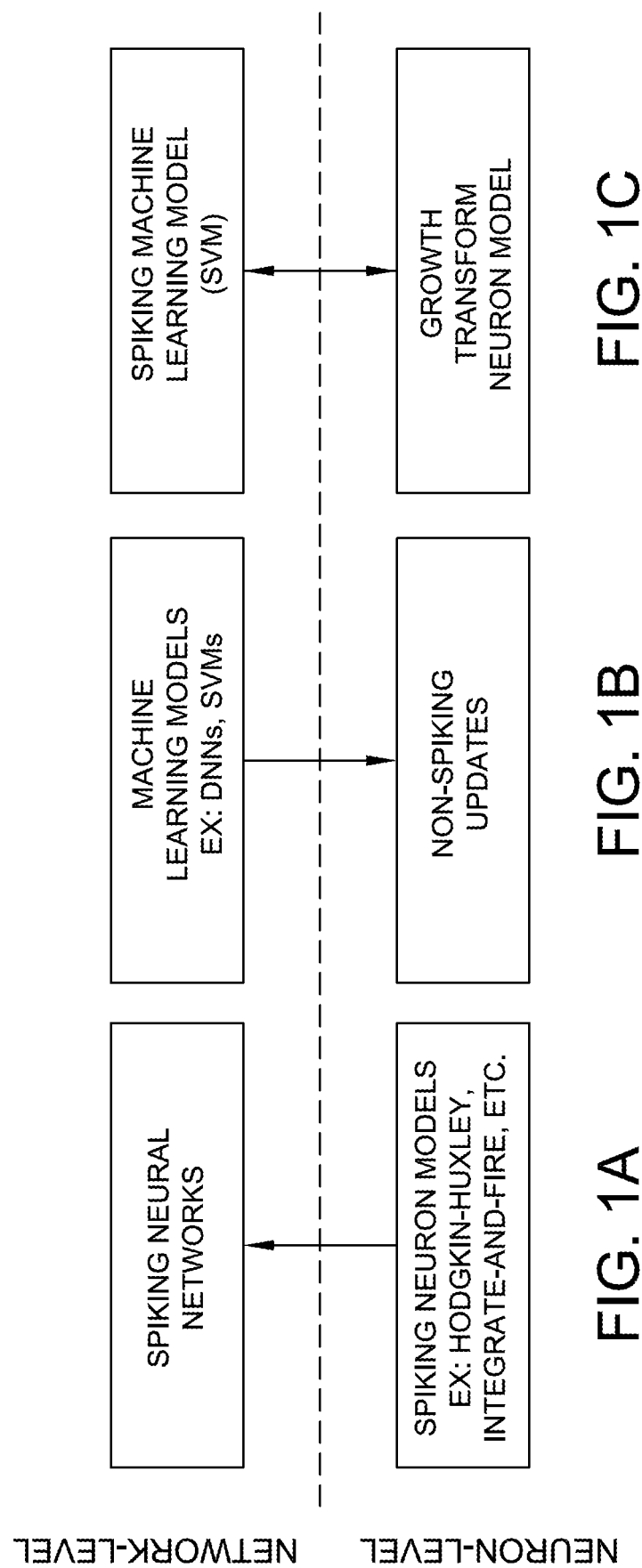

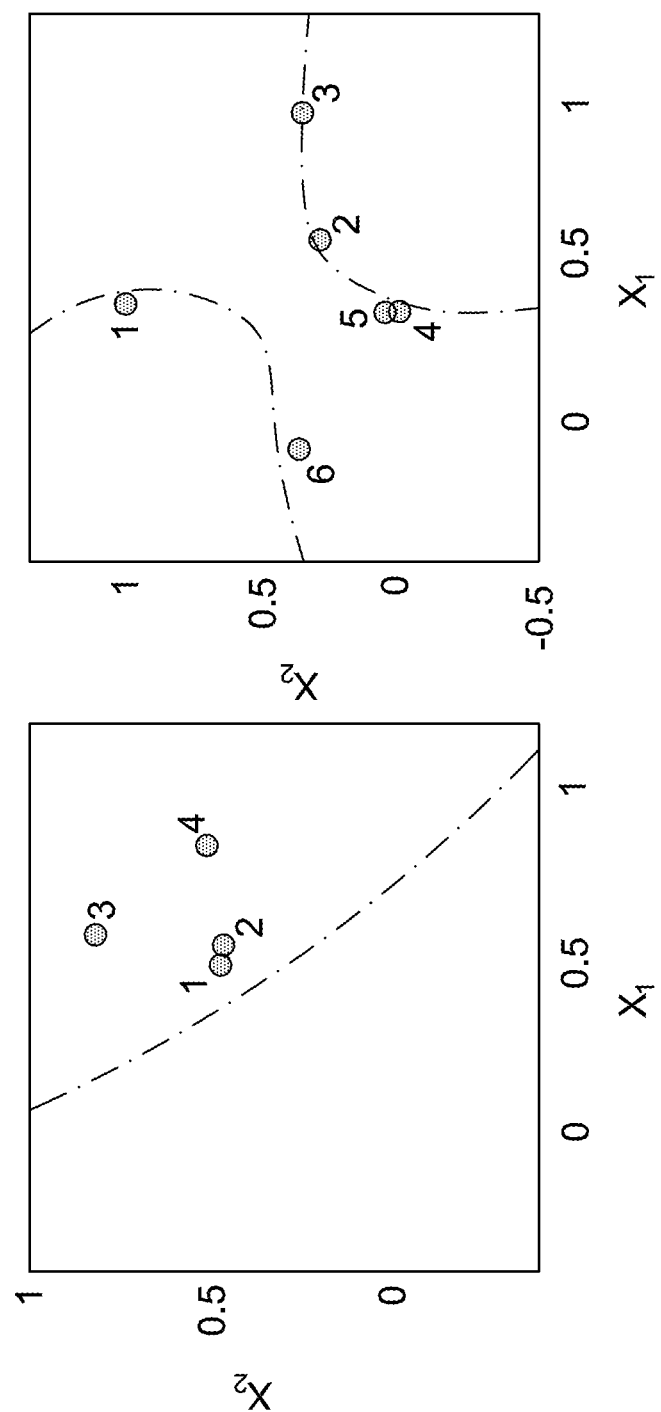

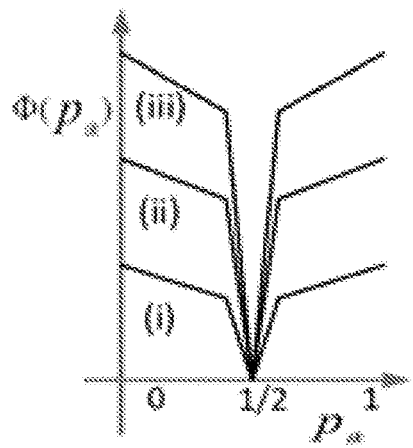
FIG. 13A
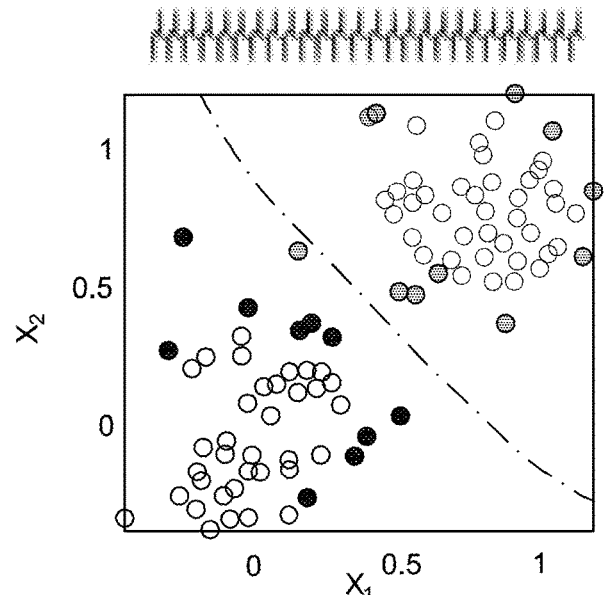
FIG. 13B
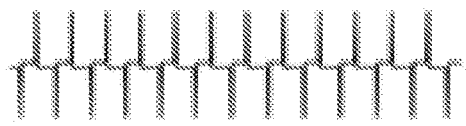
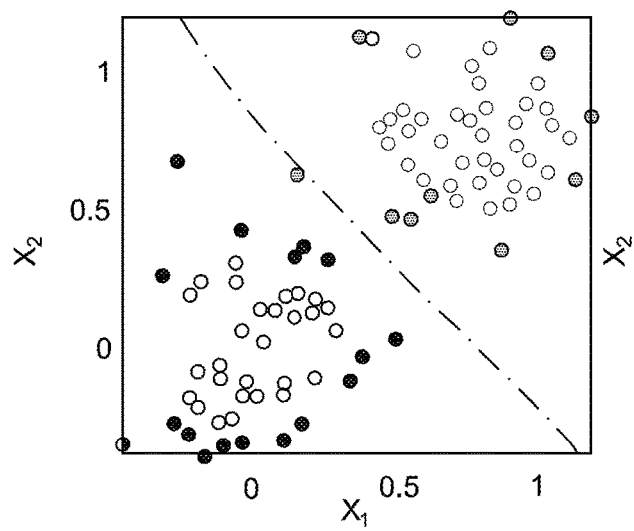
FIG. 13C
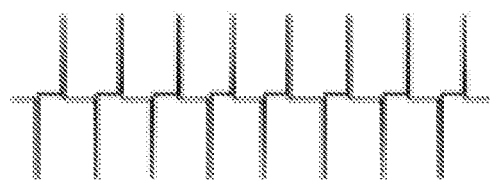
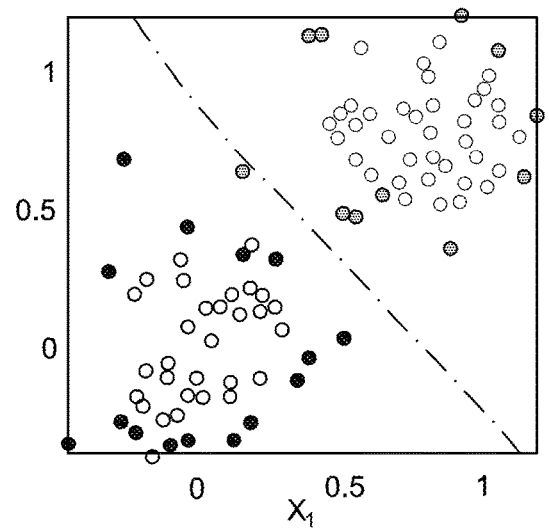
FIG. 13D

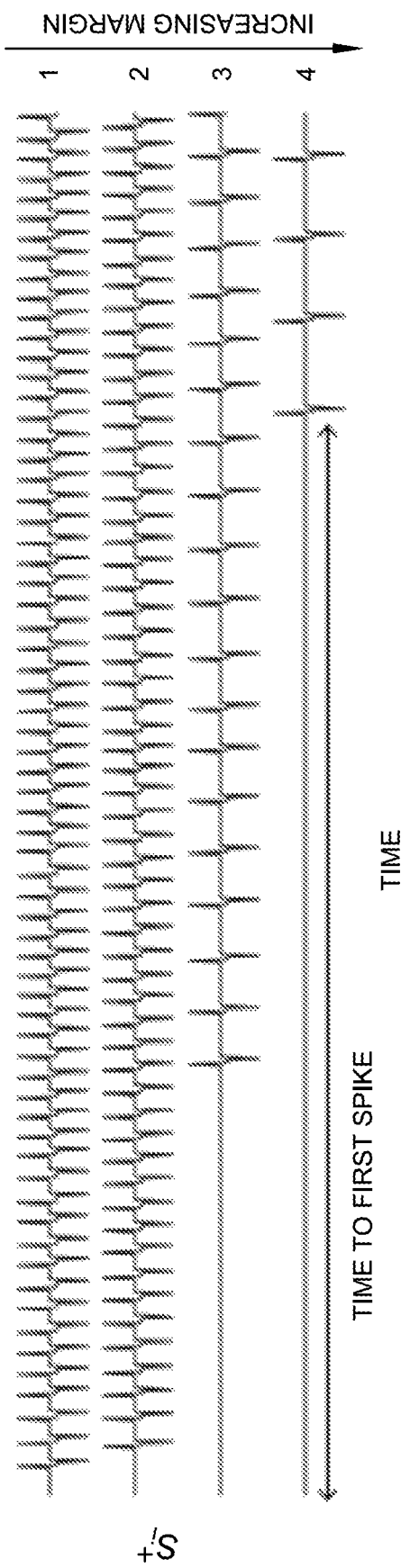
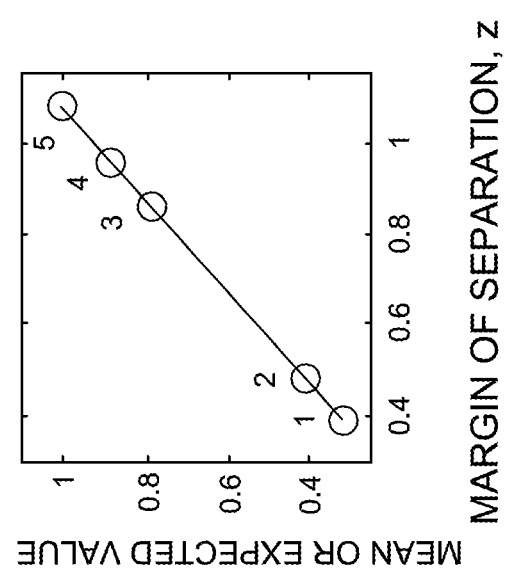
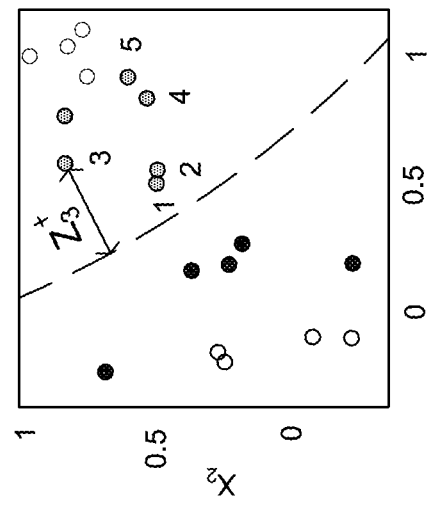
FIG. 19A
FIG. 19B
FIG. 19C

LARGE-SCALE NETWORKS OF GROWTH TRANSFORM NEURONS

CROSS-REFERENCE TO RELATED APPLICATIONS

This application is a U.S. National Phase Application of PCT/US2017/062986, filed Nov. 22, 2017, which claims the benefit of priority to U.S. Provisional Patent Application Ser. No. 62/425,372, filed Nov. 22, 2016, and to U.S. Provisional Patent Application Ser. No. 62/484,669, filed Apr. 12, 2017, the contents of which are hereby expressly incorporated by reference in their entirety.

BACKGROUND

One paradigm in the design of neuromorphic systems is to achieve robust and efficient recognition performance by mimicking the architecture and the dynamics of biological neuronal networks. A typical neuromorphic design-flow follows a bottom-up approach, as shown in FIG. 1A, starting from a model of a neuron that closely mimics its biological equivalent. Although neuronal models of varying degrees of complexity, including the Hodgkin-Huxley model, FitzHugh-Nagumo model, Izhikevich model and the simple integrate-and-fire model have been proposed, large-scale implementations of neuromorphic systems resort to a simpler form of these models, where the response of each neuron encodes some statistical property of the neuron's firing pattern, such as mean firing rate. At this level of abstraction, it is not evident how the shape, the nature and the dynamics of each individual spike is related to the overall system objective or how a coupled population of neurons self-optimizes to produce an emergent spiking or population response, such as noise-shaping.

Investigating the self-optimizing behaviors of populations of neurons in the context of well-established machine learning algorithms such as SVMs and deep neural networks (DNNs) represents one possible way to advance the understanding of neuromorphic systems, since machine learning algorithms already achieve state-of-the-art recognition performance under real-world conditions. However, these machine learning algorithms typically follow a top-down synthesis approach as illustrated in FIG. 1B, starting with a system objective function and then reducing the problem to a model of a neuron that inherently does not exhibit any spiking dynamics.

SUMMARY

In one aspect, a growth transform neural network system is provided that includes a computing device. The computing device includes at least one processor and a memory storing a plurality of modules. Each module includes instructions executable on the at least one processor. The plurality of modules includes a growth transform neural network module, a growth transform module, and a network convergence module. The growth transform neural network module defines a plurality of mirrored neuron pairs that include a plurality of first components and a plurality of second components. Each mirrored neuron pair includes one first component and one second component connected by a normalization link. The plurality of first components is interconnected according to an interconnection matrix, and the plurality of second components is also interconnected according to the interconnection matrix. The growth transform module updates each first component of each mirrored neuron pair of a plurality of mirrored neuron pairs according to a growth transform neuron model. The network convergence module converges the plurality of mirrored neuron pairs to a steady state condition by solving a system objective function subject to at least one normalization constraint. Further, the population encoding scheme is a synchrony scheme. The portion of the plurality of mirrored neuron pairs may produce the first population-encoded output after a first delay and subsequent to the one or more additional first outputs produced by the one or more additional first components as characterized by the interconnection matrix. The portion of the mirrored neuron pairs may produce the second population-encoded output after a second delay and subsequent to the one or more additional second outputs produced by the one or more additional second components as characterized by the interconnection matrix. The first delay and the second delay are at least one of predetermined fixed delays or variable delays. The first delay is a variable delay that varies based on the first external input, one or more additional first outputs produced by one or more additional first components as characterized by the interconnection matrix, convergence to the steady state condition, the user-defined potential function, or an update according to the growth transform model. The second delay is a variable delay that varies based on the second external input, one or more additional second outputs produced by one or more additional second components as characterized by the interconnection matrix, the user-defined potential function, or convergence to the steady state condition.

In another aspect, a $\Sigma\Delta$ SVM is provided that includes a growth transform neural network system. The growth transform neural network system includes a computing device. The computing device includes at least one processor and a memory storing a plurality of modules. Each module includes instructions executable on the at least one processor. The plurality of modules includes a growth transform neural network module, a growth transform module, and a network convergence module. The growth transform neural network module defines a plurality of mirrored neuron pairs that include a plurality of first components and a plurality of second components that are interconnected according to an interconnection matrix. The growth transform module updates each first component of each mirrored neuron pair of a plurality of mirrored neuron pairs according to a growth transform neuron model. The network convergence module converges the plurality of mirrored neuron pairs to a steady state condition by solving a system objective function subject to at least one normalization constraint. The first component and the second component of each mirrored neuron pair in the steady state condition may each produce a neuron response that includes a steady state value or a limit cycle with $\Sigma\Delta$ modulation according to a user-defined potential function $\Phi(p_{ik})$ given by $\Phi(p_{ik})=|p_{ik}-\frac{1}{2}|$, wherein $p_k$ is the response of $i^{th}$ neuron of the plurality of mirrored neuron pairs, and k is 1 or 2.

In an additional aspect, a spiking SVM is provided that includes a growth transform neural network system. The growth transform neural network system includes a computing device. The computing device includes at least one processor and a memory storing a plurality of modules. Each module includes instructions executable on the at least one processor. The plurality of modules includes a growth transform neural network module, a growth transform module, and a network convergence module. The growth transform neural network module defines a plurality of mirrored neuron pairs that include a plurality of first components and a plurality of second components that are interconnected according to an interconnection matrix. The growth transform module updates each first component of each mirrored neuron pair of a plurality of mirrored neuron pairs according to a growth transform neuron model. The network convergence module converges the plurality of mirrored neuron pairs to a steady state condition by solving a system objective function subject to at least one normalization constraint. The first component and the second component of each mirrored neuron pair in the steady state condition may each produce a neuron response that includes a steady state value or a limit cycle with steady state value or a limit cycle with spiking according to a user-defined potential function $\Phi(p_{ik})$ given by:

$$W+|p_{ik}-(\tfrac{1}{2}-\in)| \text{ for } 0 \leq p_{ik} < \tfrac{1}{2}-\in$$

$$W|p_{ik}-\tfrac{1}{2}| \text{ for } \tfrac{1}{2}-\in \leq p_{ik} \leq \tfrac{1}{2}+\in, \text{ and}$$

$$W+|p_{ik}-(\tfrac{1}{2}+\in)| \text{ for } \tfrac{1}{2}+\in < p_{ik} \leq 1,$$

in which $p_{ik}$ is the response of $i^{th}$ neuron of the plurality of mirrored neuron pairs, k is 1 or 2, W>1 and $\in$>0.

In another aspect, a spiking and bursting SVM is provided that includes a growth transform neural network system. The growth transform neural network system includes a computing device. The computing device includes at least one processor and a memory storing a plurality of modules. Each module includes instructions executable on the at least one processor. The plurality of modules includes a growth transform neural network module, a growth transform module, and a network convergence module. The growth transform neural network module defines a plurality of mirrored neuron pairs that include a plurality of first components and a plurality of second components that are interconnected according to an interconnection matrix. The growth transform module updates each first component of each mirrored neuron pair of a plurality of mirrored neuron pairs according to a growth transform neuron model. The network convergence module converges the plurality of mirrored neuron pairs to a steady state condition by solving a system objective function subject to at least one normalization constraint. The first component and the second component of each mirrored neuron pair in the steady state condition may each produce a neuron response that includes a steady state value or a limit cycle with $\Sigma\Delta$ modulation according to a user-defined potential function $\Phi(p_{ik})$ given by:

$$W_1\in_1+|p_{ik}-(\tfrac{1}{2}-\in_1)| \text{ for } 0 \leq p_{ik} < \tfrac{1}{2}-\in_1,$$

$$W_1|p_{ik}-\tfrac{1}{2}| \text{ for } \tfrac{1}{2}-\in_1 \leq p_{ik} \leq \tfrac{1}{2},$$

$$W_2|p_{ik}-\tfrac{1}{2}| \text{ for } \tfrac{1}{2} < p_{ik} < \tfrac{1}{2}+\in_2, \text{ and}$$

$$W_2\in_2+|p_{ik}-(\tfrac{1}{2}-\in_2)| \text{ for } \tfrac{1}{2}+\in_2 < p_{ik} \leq 1,$$

in which $p_{ik}$ is the response of $i^{th}$ neuron of the plurality of mirrored neuron pairs, k is 1 or 2, $W_1$>1, $W_2$>1 $\in_1$>0, and $\in_2$>0.

BRIEF DESCRIPTION OF THE DRAWINGS

FIG. 1A is a schematic illustration of conventional bottom-up neuromorphic network.

FIG. 1B is a schematic illustration of a conventional top-down machine learning neuromorphic network.

FIG. 1C is a schematic illustration of a growth transform neural network that connects to the conventional machine learning models to produce emergent spiking dynamics according to one aspect of the disclosure.

FIG. 5B is an enlarged illustration of the classification space shown in FIG. 4B showing the highlighted neurons corresponding to the limit cycles of FIG. 5A.

FIG. 5D is an enlarged illustration of the classification space shown in FIG. 4C showing the highlighted neurons corresponding to the limit cycles of FIG. 5C.

FIG. 13A is a graph showing three versions of potential functions.

FIG. 13B is a limit cycle (above) and classification space (below) corresponding to a first potential function (i) of FIG. 13A.

FIG. 13C is a limit cycle (above) and classification space (below) corresponding to a second potential function (ii) of FIG. 13A, illustrating that spiking rate and the magnitudes of the spikes were adapted while keeping the classification performance (or boundaries) similar to those of FIG. 13B.

FIG. 13D is a limit cycle (above) and classification space (below) corresponding to a third potential function (iii) of FIG. 13A, illustrating that spiking rate and the magnitudes of the spikes were adapted while keeping the classification performance (or boundaries) similar to those of FIG. 13B and FIG. 13C.

FIG. 19A is a graph of a classification space showing a classification boundary produced by a spiking SVM for a simple linearly separable two-class problem. Filled circles indicate the 'support vector' neurons.

FIG. 19B is a graph showing a network response of four support vectors from FIG. 19A, and showing bursting dynamics as a function of the margin of separation.

FIG. 19C is a graph showing the mean of the neuron output $S_{ik}$ as a function of the margin of separation of the support vector neurons illustrated in FIG. 19A.

DETAILED DESCRIPTION

Figure 2A:
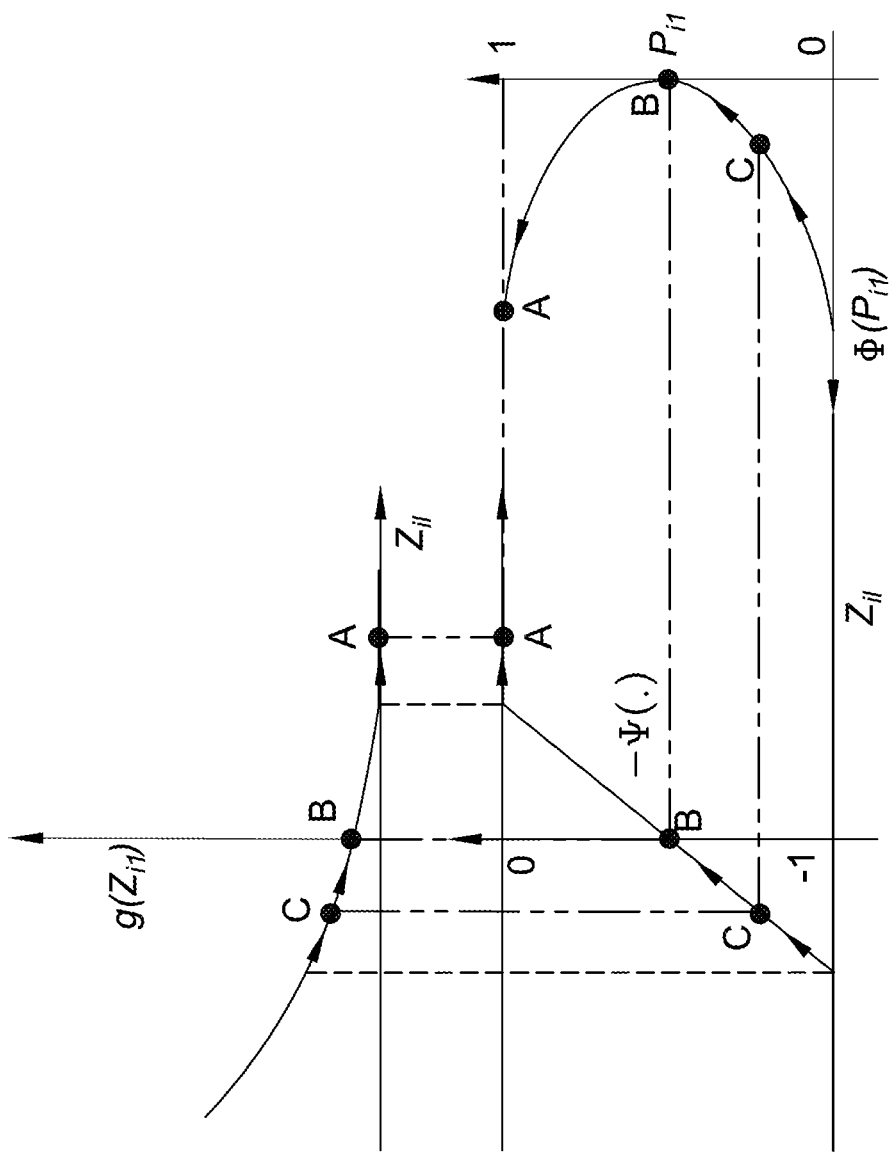
FIG. 2A is a graph showing a primal loss function and the corresponding dual potential function corresponding to a GiniSVM.

In various aspects, a growth transform neuron model is mutually coupled with a network objective function of a machine learning model, as illustrated in FIG. 1C. While each individual neuron traverses a trajectory within the dual optimization space as the system converges on a solution, the overall network traverses a trajectory in an equivalent primal optimization space. As a result, the network of growth transform neurons solves classification tasks while producing unique but interpretable neural dynamics, such as noise-shaping, spiking and bursting.

In various aspects, growth transform neural network systems are disclosed that incorporate the dynamical properties of a network of neurons in which each neuron implements an asynchronous mapping based on polynomial growth transforms. The disclosed growth transform neural network systems make use of a geometric approach for visualizing the dynamics of the network in which each of the neurons traverses a trajectory in a dual optimization space, and in which the network itself traverses a trajectory in an equivalent primal optimization space. In various other aspects, as the network learns to solve basic classification tasks, different choices of primal-dual mapping produce unique, but interpretable neural dynamics, such as noise-shaping, spiking and bursting. The disclosed growth transform neural network systems in some aspects are compatible with the design of support vector machines (SVMs) including, but not limited to, $\Sigma\Delta$ SVMs that exhibit noise-shaping properties similar to that of $\Sigma\Delta$ modulators and spiking/bursting SVMs that encode information using spikes and bursts. As described in detail below, individual neurons within the disclosed growth transform neural network systems learn to generate switching, spiking and burst dynamics to encode each neuron's respective margins of separation from a classification hyperplane the parameters of which are encoded by the network population dynamics.

The disclosed growth transform neuron model and the underlying geometric visualization connect well-established machine learning algorithms, such as SVMs, to neuromorphic principles, such as spiking, bursting, population encoding and noise-shaping. However, unlike conventional neuromorphic approaches, the growth transform neuron model is tightly coupled to the system objective function which results in network dynamics that are reliably stable, interpretable and the process of spike generation and encoding is the result of the optimization process.

In one aspect, the disclosed neural network system is incorporated into a spiking support vector machine (SVM) that includes a network of growth transform neurons, as described herein below. Each neuron in the SVM network learns to encode output parameters such as spike rate and time-to-spike responses according to an equivalent margin of classification and those neurons corresponding to regions near the classification boundary learn to exhibit noise-shaping dynamics similar to behaviors observed in biological networks. As a result, the disclosed spiking support vector machine (SVM) enables large-scale population encoding, for examples for a case when the spiking SVM learns to solve two benchmark classification tasks, resulting in classification performance similar to that of the state-of-the-art SVM implementations.

Neural networks, in their generic form, include a set of basic computing units called neurons that are interconnected with each other through a set of synaptic junctions. Mathematically, the response of each of the neurons is modeled according to Eqn. (1):

$$\alpha_i = \Theta(\Sigma_j Q_{ij} \alpha_j + b_i) \quad (1)$$

where $\alpha_i \in \mathbb{R}$ corresponds to the response of the neuron $i \in \{1, \ldots, N\}$, N being the total number of neurons in the network, $Q_{ij} \in \mathbb{R}$ corresponds to an element of the synaptic weight matrix that connects neuron/with neuron i, $b_i \in \mathbb{R}$ corresponds to an activation threshold for the neuron i and $\Theta(.)$ corresponds to a generic activation function that produces the response $\alpha_i$.

By choosing different forms of the mapping function $\Theta(.)$ and by choosing different forms of the weight matrix $Q=\{Q_{ij}\}$, the simple model in Eqn. (1) is adapted to implement different variants of neural networks. Some of the examples include multi-layer perceptron networks, recurrent neural networks, cellular neural networks and support vector machines (SVMs). In the most popular implementations, the choice of the activation function $\Theta(.)$ in Eqn. (1) is a simple compressive mapping like the sigmoidal or the logistic functions. However, a network comprising of feedforward and feedback synaptic connections and comprising of neurons with a more complex mapping $\Theta(.)$ can exhibit complex dynamics which includes limit-cycles and chaotic oscillations. These rich sets of dynamics, except for specific classes of cellular neural networks, have been found to be difficult to interpret and control in a manner that the overall network can achieve a desired system objective, for instance solve a complex classification task.

In one aspect, the growth transform neural network design and analysis includes estimating an equivalent dual optimization function based on the mapping given by Eqn. (1). Each neuron implements a continuous mapping based on a polynomial growth transform update that also dynamically optimizes the cost function. Because the growth transform mapping is designed to evolve over a constrained manifold, the neuronal responses and the network are stable. The switching, spiking and bursting dynamics of the neurons emerge by choosing different types of potential functions and hyper-parameters in the dual cost function. The use of this approach is suitable for use in the design of SVMs that exhibit $\Sigma\Delta$ modulation type limit-cycles, spiking behavior and bursting responses. To understand the relationship between the population dynamics of the neural network and the system objective function, the primal formulation corresponding to Eqn. (1) is also estimated. Different statistical properties of the growth transform neurons encode the classification properties of the network which include the classification margin and noise-shaping.

In various aspects, a geometric framework is derived and presented to visualize the process of primal-dual optimization satisfying Eqn. (1) as their respective first-order conditions. This approach expands methods of visualizing the solution to different types of SVMs and further extends these methods to the visualization of the trajectories of the variables during optimization. In section I, the model of the neuron derived by applying growth transforms to the dual optimization function is presented. In various other aspects, the graphical approach is used to design an SVM classifier that exhibits $\Sigma\Delta$ limit-cycles, spiking and bursting dynamics. The statistical properties of these dynamics are shown to encode the margin of separation for an underlying classification problem and the dynamics are shown to be adjustable to obtain different encoding properties.

A continuous-time variant of the growth transform neuron model is described herein and a network of growth transform neurons is used to implement a spiking SVM. The growth transform neuron in the SVM network may learn to encode (rate and time-to-spike response) its output according to an equivalent margin of classification and the neurons corresponding to regions near the classification boundary may learn to exhibit noise-shaping dynamics similar to what has been reported in biological networks. In one aspect, the model of the growth transform neuron is summarized along with its dynamical properties. In another aspect, an SVM formulation is mapped onto a growth transform neural network and different spiking dynamics are demonstrated based on synthetic and benchmark datasets.

I. Mathematical and Geometric Formulation of Growth Transform Neural Network

A. Geometric View of Primal-Dual Optimization

Without any loss of generality, it is assumed that the response of the neuron i, $\alpha_i$ is bounded according to:

$$|\alpha_i| \le 1. \quad (2)$$

These constraints are typical of neural network optimizations where a sigmoidal type of function for $\Theta(.)$ is used to bound $\alpha_i$. In various aspects, the form of $\Theta(.)$ is kept general to enable implementation of both continuous and switching or spiking responses.

The response $\alpha_i$ of the $i^{th}$ neuron and the corresponding bias $b_i$ is decomposed into two differential components:

$$\alpha_i = p_{i1} - p_{i2}, \text{ and} \quad (3)$$

$$b_i = b_{i1} b_{i2} \quad (4)$$

where $p_{i1}$ and $p_{i2}$ satisfy the following constraints such that Eqn. (2) holds:

$$p_{i1} + p_{i2} = 1 \quad (5)$$

$$p_{i1}, p_{i2} \ge 0. \quad (6)$$

Eqn. (1) is re-written as:

$$p_{i1} - p_{i2} = \Theta\left(\sum_j Q_{ij}(p_{j1} - p_{j2}) + b_{i1} - b_{i2}\right)$$

or, $$\Theta^{-1}(p_{i1} - p_{i2}) = (\Sigma_j Q_{ij} p_{j1} + b_{i1}) - (\Sigma_j Q_{ij} p_{j2} + b_{i2}) \quad (7)$$

$\Theta(.)$ is chosen such that it is decomposed as follows:

$$\Theta^{-1}(p_{i1} - p_{i2}) = \Psi^{-1}(p_{i1}) - \Psi^{-1}(p_{i2}), \quad (8)$$

where $\Psi^{-1}(.)$ is a mirror function designed to include discontinuities. Note that if $\Psi^{-1}(.)$ is anti-symmetric about 0.5 and $\Theta^{-1}(.)$ is anti-symmetric about 0.0:

$$\Psi^{-1}(u) = \tfrac{1}{2}\Theta^{-1}(2u - 1), \text{ for } 0 \le u \le 1. \quad (9)$$

From Eqns. (7) and (8), it follows that $$\Psi^{-1}(p_{ik}) = \Sigma_j Q_{ij} p_{jk} + b_{ik}, k = 1, 2 \quad (10)$$

Thus, the neural network is re-modeled using variables $p_{i1}$ and $p_{i2}$ according to:

$$p_{ik} = \Psi(\Sigma_j Q_{ij} p_{jk} + b_{ik}), k = 1, 2 \quad (11)$$

under the constraints of Eqns. (5) and (6).

This formulation is now consistent with the multi-class probability regression framework which was used for deriving different variants of SVMs. Introducing variables $y_{jk}$, Eqn. (10) is expressed as:

$$\Psi^{-1}(p_{ik}) = \Sigma_j Q_{ij}(p_{jk} + y_{jk}) \quad (12)$$

where $b_{ik}$ satisfies the relation:

$$b_{ik} = -\Sigma_j Q_{ij} y_{jk}, k = 1, 2 \quad (13)$$

under the assumption that $Q^{-1}$ exists. Eqn. (12) along with the constraints given by Eqns. (5) and (6) are viewed as a first-order condition for the following minimization problem:

$$\underset{p_{ik}}{\operatorname{argmin}} \mathcal{D}\{p_{ik}\} = \quad (14)$$

$$\sum_{k=1}^{2}\left[\sum_{i=1}^{N}\sum_{j=1}^{N} Q_{ij}(p_{jk} - y_{jk})(p_{ik} - y_{ik}) - \sum_{i=1}^{N} \int \Psi^{-1}(p_{ik}) dp_{ik}\right]$$

$$= \sum_{k=1}^{2}\left[\sum_{i=1}^{N}\sum_{j=1}^{N} Q_{ij}(p_{jk} - y_{jk})(p_{ik} - y_{ik}) + \sum_{i=1}^{N} \Phi(p_{ik})\right] \quad (15)$$

where $$\Phi(p_{ik}) = -\int \Psi^{-1}(p_{ik}) dp_{ik}. \quad (16)$$

$\Phi(.)$ is referred to as the potential function. If it is assumed that the matrix Q is positive-definite, the first part of the optimization function in Eqn. (15) is equivalent to minimizing a quadratic distance between the responses $p_{ik}$ and the variables $y_{ik}$. The second part of the optimization function is equivalent to minimizing a cumulative potential function $\Phi(.)$ corresponding to each neuron.

To complete the geometric framework and show its connection with SVMs, a primal cost function is derived that is used to visualize the response of the network when the trajectory of the neuron evolves according to $\Psi(.)$. A network variable $z_{ik}$ is introduced, given by $$z_{ik} = \Sigma_j Q_{ij} p_{ik} + b_{ik} \quad (17)$$

such that Eqn. (11) is rewritten as $$p_{ik} = \Psi(z_{ik}). \quad (18)$$

Since the interconnection matrix Q is assumed to be positive-definite, each of its elements $Q_{ij}$ are written as an inner-product between two vectors as $Q_{ij} = x_i \cdot x_j$, $x_i \in \mathbb{R}^D$, similar to that of a kernel matrix used in SVMs. Thus, each neuron i in the network is associated with a vector $x_i$ which enables the neuron to be mapped onto a metric space $\mathbb{R}^D$, providing an alternate geometric representation of the neural network. Thus, $$z_{ik} = \left(\sum_j x_j p_{jk}\right) \cdot x_i + b_{ik} \quad (19)$$

$$= w_k \cdot x_i + b_{ik} \quad (20)$$

represents the distance of the vector $x_i$ from a hyper-plane in the co-ordinate space parameterized by a weight vector $w_k$ and offset $b_{ik}$ where $$w_k = \Sigma_j x_j p_{jk} = \Sigma_j x_j \Psi(z_{jk}). \quad (21)$$

Eqns. (20) and (21) are considered to be the first order condition for minimizing a primal cost function P with respect to the vector $w_k$, where P is given by:

$$\mathcal{P} = \quad (22)$$

$$\frac{1}{2}\sum_{k=1}^{2} \|w_k\|^2 - \sum_{i=1}^{N}\sum_{k=1}^{2} \int \Psi(z_{ik}) dz_{ik} = \sum_{k=1}^{2} \frac{1}{2}\|w_k\|^2 + \sum_{i=1}^{N}\sum_{k=1}^{2} g(z_{ik})$$

where $$g(z_{ik}) = \int \Psi(z_{ik}) dz_{ik}. \quad (23)$$

The mapping between the response of the neuron ($p_{ik}$) to the response of the network $g(z_{ik})$ according to $$\Phi(p_{ik}) \xleftarrow{\int dp_{ik}} \Psi^{-1}(p_{ik}) \leftrightarrow \Psi(z_{ik}) \xrightarrow{\int dz_{ik}} g(z_{ik}) \quad (24)$$

is useful for visualizing the nature of the solution and the network's dynamical response, as demonstrated next using a specific example of a previously defined probabilistic GiniSVM.

Figure 2C:
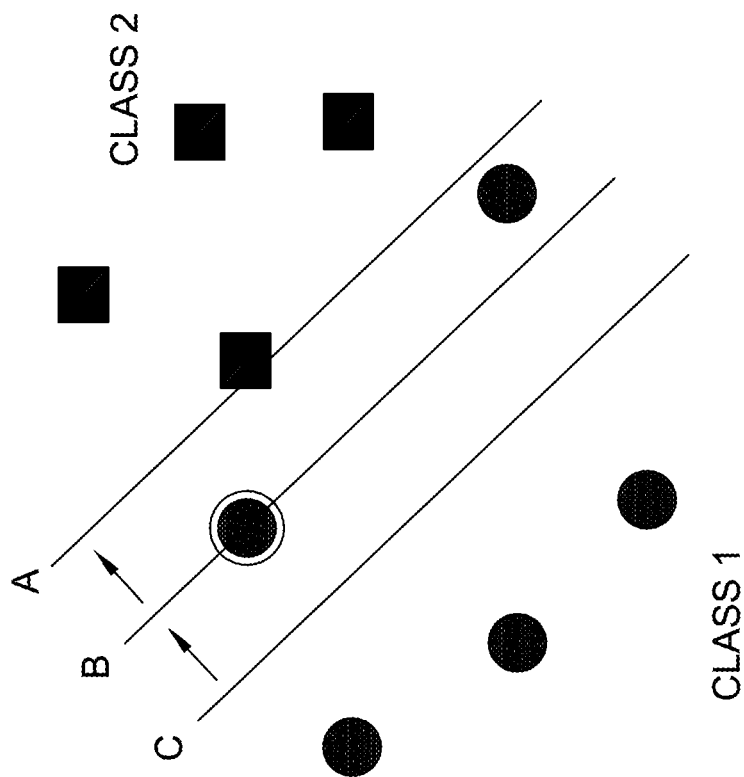
FIG. 2C is an illustration of a classification space showing a trajectory of the optimization C→B→A as traversed by a neuron shown in FIG. 2A and the corresponding change in its margin of separation from the classification boundary.
Figure 2B:
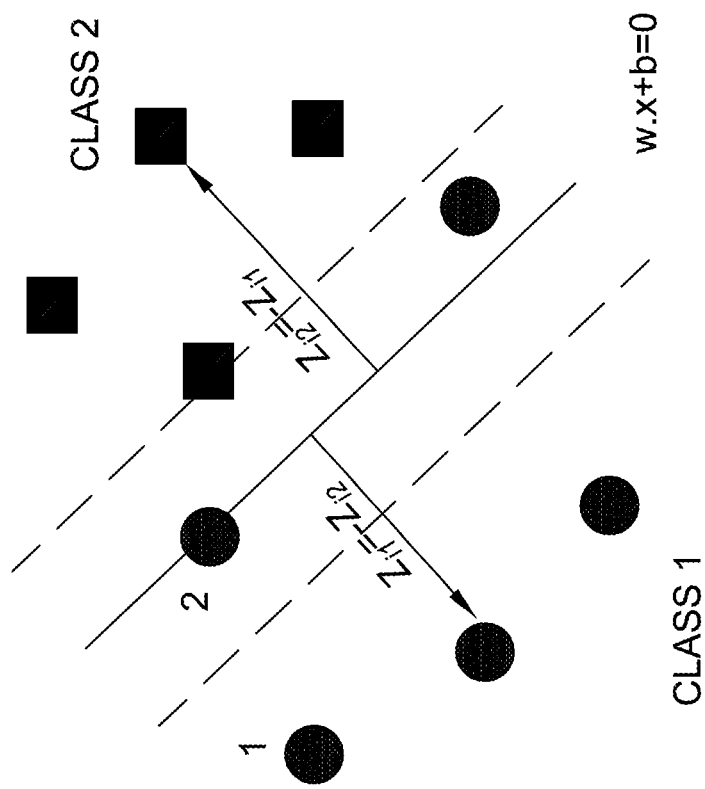
FIG. 2B is an illustration of a classification space, illustrated using two dimensions and showing that for a positive-definite interconnection matrix, each neuron is mapped to an equivalent vector in the classification space.

For a GiniSVM, the function $\Psi(.)$ is a piece-wise linear continuous function, as shown in FIG. 2A. The corresponding potential function is given by $\Phi(p_{i1}) = (p_{i1} - \frac{1}{2})^2$ and is obtained by integrating the inverse of $\Psi(.)$ as described in Eqn. (24). The corresponding loss-function $g(.)$ is obtained by integrating $\Psi(.)$ and is also illustrated in FIG. 2A. If the variables $y_{ik}$ represent the binary labels that categorize the vectors $x_i$ (and hence the $i^{th}$ neuron) into one of two possible classes $k = (1, 2)$, the variable $z_{i1}$ then corresponds to the distance of the vector $x$, from a classification hyperplane given by Eqn. (20). The classification hyperplane is illustrated in FIG. 2B which shows the location of the vectors A, B and C in the feature space and the respective mappings according to Eqn. (24) are shown in FIG. 2A.

This visualization is used to understand the sparsity of an SVM solution or to determine the location of the support vectors. In an aspect, the visualization tool is also used to understand the dynamics of the optimization process as the dual cost function is optimized. This visualization is illustrated in FIG. 2C where one of the neurons traverses the trajectory C→B→A in the primal and dual optimization space. Accordingly, the classification hyperplane also optimizes itself as shown in FIG. 2C.

B. Growth Transform Neuron Model

In various aspects, since Eqn. (1) also represents a first-order condition for the dual optimization problem, one approach to implement a dynamic model of a neuron is to update the variables $p_{ik}$, $k = 1, 2$ such that the dual cost function D is optimized over a manifold H defined by:

$$H = \{p_{ik} : p_{ik} \leq 0 \text{ and } p_{i1} + p_{i2} = 1\} \quad (25)$$

In an aspect, this evolution process is implemented using a polynomial growth transform, which is a fixed-point algorithm for optimizing polynomial functions over a probability manifold, such as H Growth transforms are applied to optimize dual-cost functions that occur in different variants of SVMs and in various aspects, a similar approach is used to implement the model of a neuron that can exhibit different dynamical properties based on different choices of the mapping function in Eqn. (1).

For the cost function $D\{p_{ik}\}$ in Eqn. (15), a growth-transform neuron updates its response $p_{ik}$ according to:

$$p_{ik} \leftarrow \sigma(p_{ik}) = \frac{1}{\mu_i} p_{ik} \left( \frac{\partial \mathcal{D}(p_{ik})}{\partial p_{ik}} + K_i \right) = \frac{1}{\mu_i} p_{ik} \left( \sum_{j=1}^{N} Q_{ij} p_{jk} + b_{ik} + S_{ik} + K_i \right),$$

$$k = 1, 2$$

$$S_{ik} = \Phi'(p_{ik}) \quad (26)$$

where $$\mu_i = p_{i1} \left( \frac{\partial \mathcal{D}(p_{i1})}{\partial p_{i1}} + K_i \right) + p_{i2} \left( \frac{\partial \mathcal{D}(p_{i2})}{\partial p_{i2}} + K_i \right) \quad (27)$$

is a normalization factor that ensures $p_{i1} + p_{i2} = 1$.

$K = \{K_i\}$, $i = 1 \ldots N$ is a constant vector of nonnegative elements which is admissible if $$p_{ik} \left( \frac{\partial \mathcal{D}(p_{i1})}{\partial p_{i1}} + K_i \right) \geq 0 \forall p_{ik} \in H \text{ and}$$

$$\sum_{k=1}^{2} p_{ik} \left( \frac{\partial \mathcal{D}(p_{i1})}{\partial p_{i1}} + K_i \right) > 0 \forall i.$$

If $\Phi'0(.)$ (or $S(.)$) is a continuous polynomial function, growth transform ensures that:

$$\mathcal{D} \{\sigma(p_{ik})\} \geq \mathcal{D} \{p_{ik}\}. \quad (28)$$

with equality only if $p_{ik}$ is a critical point of D.

However, if $\Phi'0(.)$ is discontinuous over a sub-domain $X \in H$ and if the critical point is not reachable by the growth transform updates, some of the variables $p_{ik}$ exhibit limit-cycles about the sub-domain X The dynamic properties of the limit-cycle are determined by the shape of the potential function $\Phi(.)$, which may produce $\Sigma\Delta$ modulation, spiking, and/or bursting as the network converges to a steady-state solution.

Figure 3:
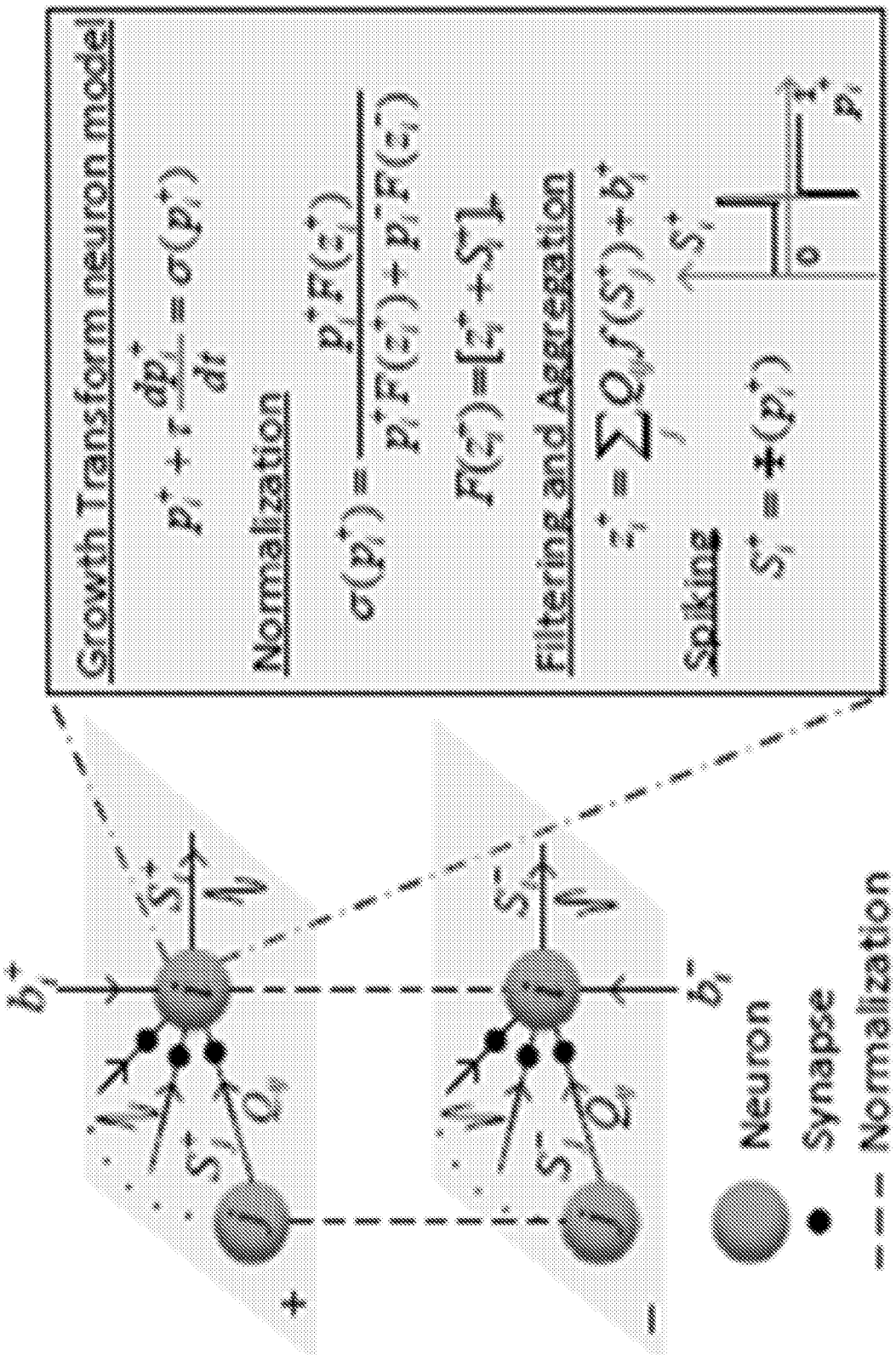
FIG. 3 is a schematic illustration showing a growth-transform model of a spiking neural network. Spike trains from all neurons in the network are aggregated and filtered at the destination neuron, normalized for each mirror neuron pair according to growth-transform updates, and outgoing spike trains are generated and communicated across the network.

The architecture of a growth transform neural network includes a set of basic computing units (neurons) interconnected by a set of synaptic junctions. One architectural difference between existing neural networks and growth transform neural networks is that each of the neurons in a growth transform neural network are mirrored, as shown in FIG. 3, and the mirrored neurons are connected with each other by a normalization link. The pre-synaptic mirror neurons j connect to the post-synaptic neurons i via a synaptic junction denoted by its weight $Q_{ij}$. Each set of mirror neurons is associated with a pair of internal variables $p_i^+$ and $p_i^-$; $i = 1 \ldots N$, such that they satisfy a normalization criterion $p_i^+ + p_i^- = 1$.

The mathematical model that governs the evolution of the variables $p_i^+$, $p_i^-$ is summarized in FIG. 3, and is viewed as a series of intermediate processes. Like other spiking neuron models, each growth transform neuron also aggregates and filters the spikes $S_j^+$ received from the pre-synaptic neuron j, which is then weighted by $Q_{ij}$. The neuron also receives an external input $b_i^+$ and its corresponding mirror neuron receives an input $b_i^-$, as shown in FIG. 3. The aggregated input is then normalized based on a growth transformation $\sigma(.)$ and the shape of the spike $S_i^+$ that is generated is based on a mapping of the internal variable $p_i^+$, as shown in FIG. 3. In one aspect, there exists a relationship between the spiking function $\Phi(.)$, the aggregation function $f(.)$ and the normalization function $F(.)$, all of which are connected to a system objective function as described herein above.

II. $\Sigma\Delta$ Support Vector Machines

Figure 4A:
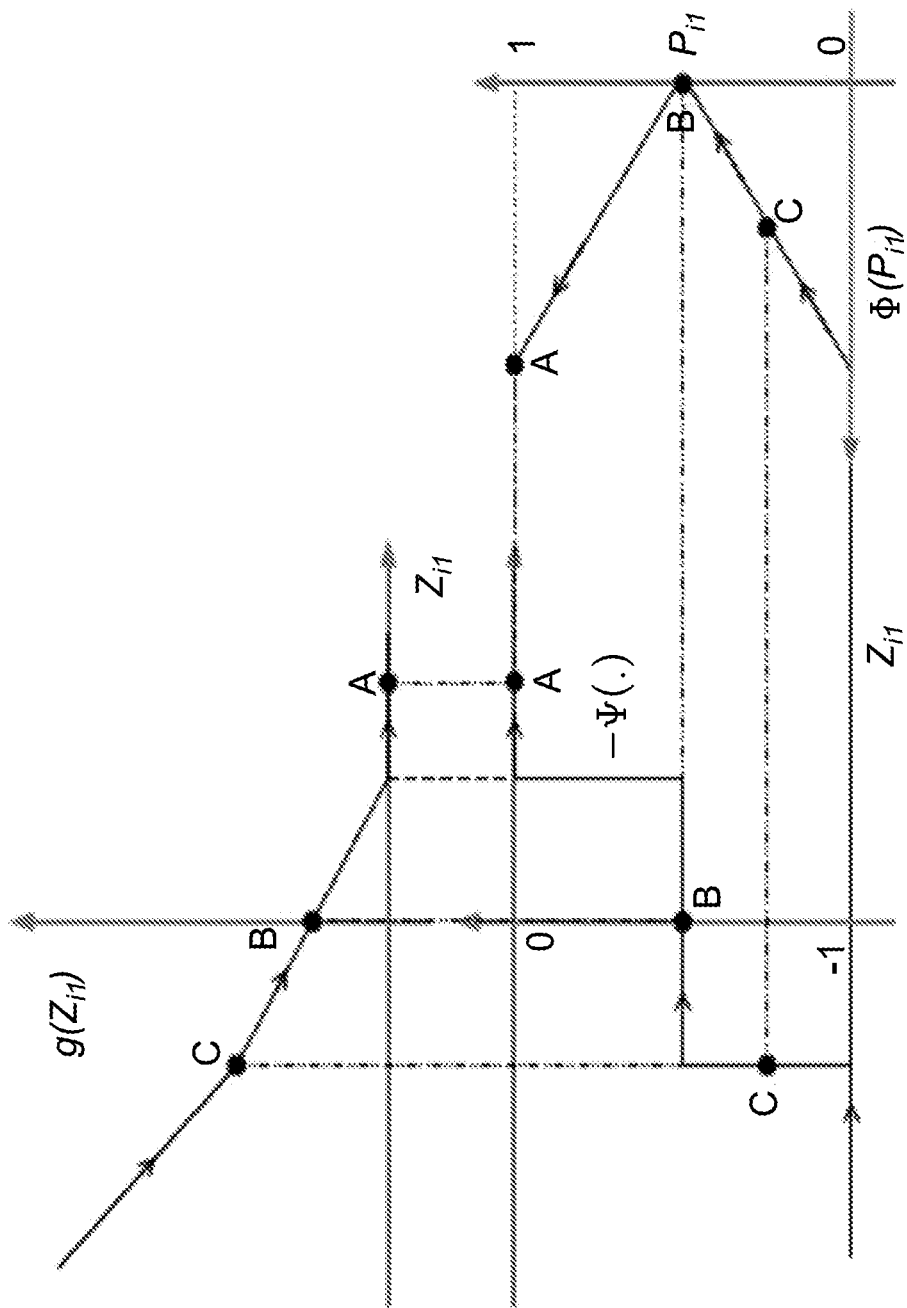
FIG. 4A is a graph showing a primal loss function and the corresponding dual potential function for $\Sigma\Delta$ SVM.

In various aspects, the growth transform neural network is incorporated into the design of a $\Sigma\Delta$ support vector machine (SVM). In this aspect, the potential function is given by $\Phi(p_{ik}) = |p_{ik} - \frac{1}{2}|$, as shown in FIG. 4A. The gradient of the function $\Phi(.)$ in this aspect has a discontinuity at $p_{ik} = \frac{1}{2}$, $k = (1, 2)$, $\forall i$. The corresponding primal loss-function corresponding to a binary classification task is obtained using the geometric approach described by Eqn. (24) and illustrated in FIG. 4A. The primal loss-function exhibits a piece-wise linear response where the slope of the loss-function changes at classification margins (or errors) that are symmetric about the separating hyperplane. For the piece-wise linear potential function, the response of the $i^{th}$ neuron is given by $$S_{ik}\Phi'(p_{ik})=\text{sgn}(p_{ik}-0.5) \tag{29}$$

and represents a binary output that switches between two values +1 and −1.

However, not all neurons in the $\Sigma\Delta$ support vector machine (SVM) exhibit a switching behavior, as is inferred from the geometric visualization of the primal-dual formulation shown in FIG. 4A. Only the neurons whose classification margins are located about B in FIG. 4A can transition between C and A where the gradient of $\Phi(.)$ is discontinuous. Note that in the dual-optimization space (shown in FIG. 4A), this corresponds to $p_{ik}\approx 0.5$. Classification boundaries are plotted on a two-dimensional feature space in FIGS. 4B and 4C for a simple linear and a non-linear classification task respectively. Only the points close to the separating hyperplane (see FIGS. 5B and 5D) exhibit a switching behavior, as shown in FIGS. 5A and 5C, where $p_{ik}$ of selective neurons are plotted with respect to time after the network has converged to a steady-state limit-cycle behavior.

Figure 6A:
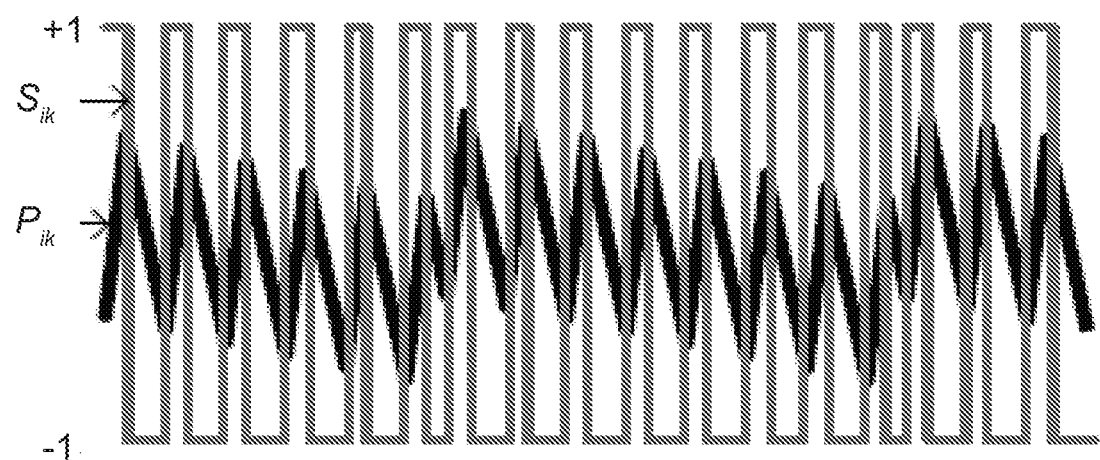
FIG. 6A is a schematic illustration showing the relationship of the quantized response $S_{ik}=\text{sgn}(p_{ik}-1/M)$ to the $\Sigma\Delta$ limit cycles.

FIG. 6A shows a snapshot of the limit-cycle dynamics comparing the time-evolution of $p_{ik}$ and the neuron output $S_{ik}$. The system dynamics bear resemblance to that of a first-order $\Sigma\Delta$ modulator where $p_{ik}$ corresponds to the output of an integrator in the $\Sigma\Delta$ modulator and $S_{ik}$ corresponds to the quantized output used for digital encoding of an input stimulus. In the case of the network of growth-transform neurons, the output of each neuron encodes its classification margin $z_{ik}$, which is verified in FIG. 6B. The result shows that the run-time average of $S_{ik}$ perfectly tracks the classification margin $z_{ik}$. This attribute is similar to that of a first-order $\Sigma\Delta$ modulation. This observation yields an alternate model for growth transform neurons, which is closer to the conventional framework of a spiking neuron model. In the previous model given by Eqn. (24), neuron j communicated with neuron i through an analog variable $p_{jk}$ instead of the neural output $S_{jk}$. Because the time-average of $S_{ik}$ encodes the margin variable $z_{ik}$, $$z_{ik} = \frac{1}{T}\int_{t=0}^{t=T}S_{ik}(t)dt \tag{30}$$

which in turn is related to the variable $p_{ik}$. Using Eqns. (18) and (26):

$$p_{ik} \leftarrow \frac{1}{\mu_i}p_{ik}\left(\sum_{j=1}^{N}Q_{ij}\Psi\left(\frac{1}{T}\int_{t=0}^{t=T}(t)dt\right)+b_{ik}+S_{ik}+K_i\right), \tag{31}$$

$$k = 1, 2$$

Figure 4C:
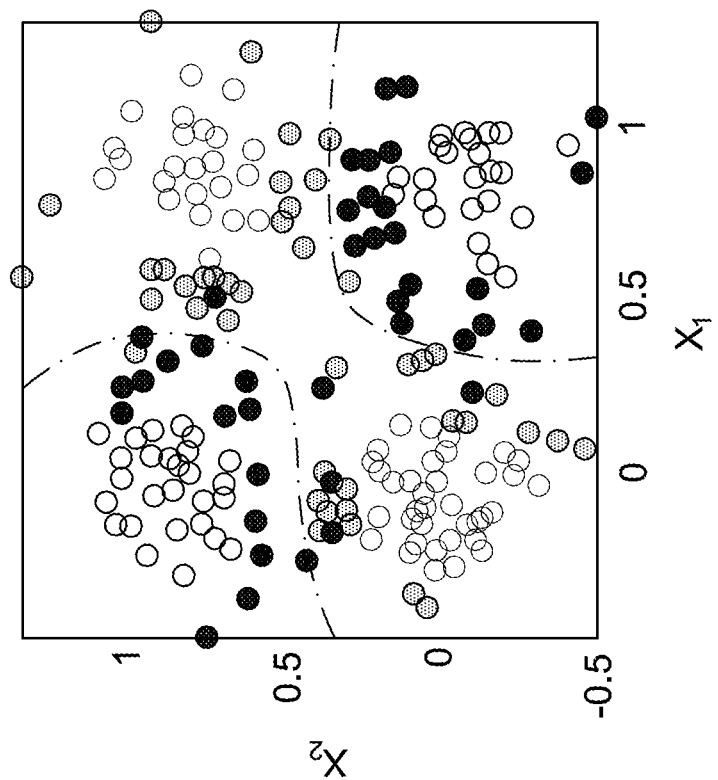
FIG. 4C is an illustration of a classification space showing a classification boundary produced by a $\Sigma\Delta$ SVM for a nonlinearly separable two-class problem.
Figure 4B:
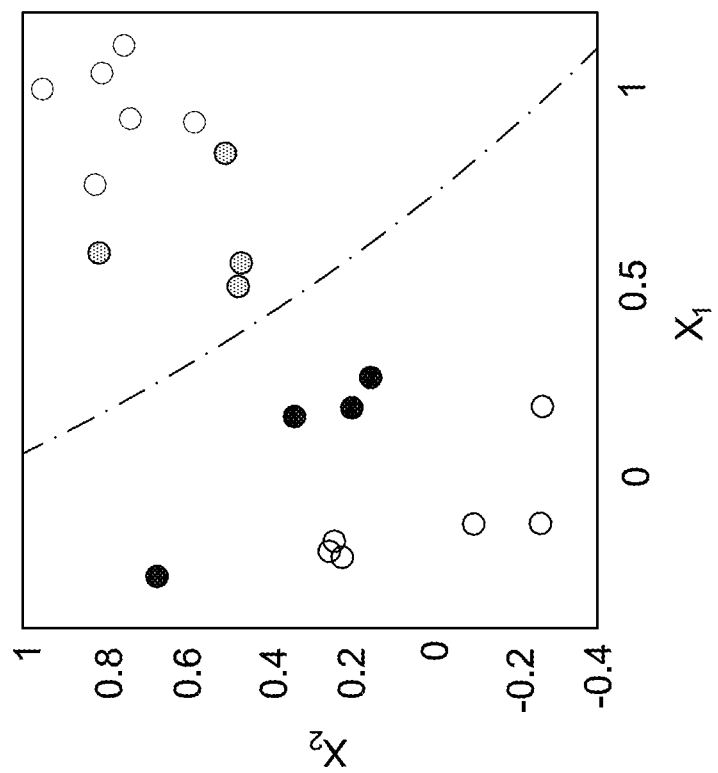
FIG. 4B is an illustration of a classification space showing a classification boundary produced by a $\Sigma\Delta$ SVM for a linearly separable two-class problem.
Figure 5A:
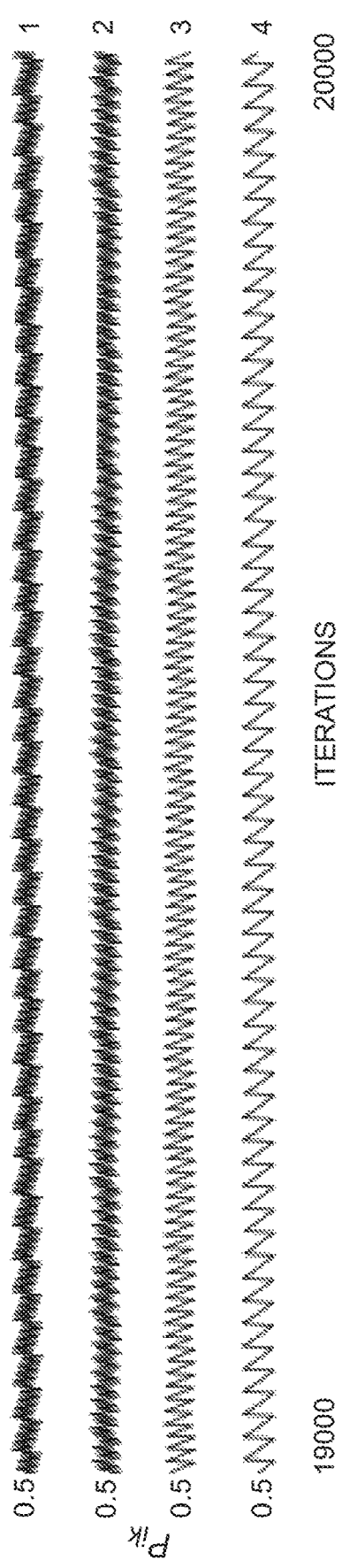
FIG. 5A is a graph showing a $\Sigma\Delta$ limit cycle corresponding to the neurons highlighted in FIG. 4B, sorted according to the neuron's margin of separation from the classification boundary of FIG. 4B.
Figure 5C:
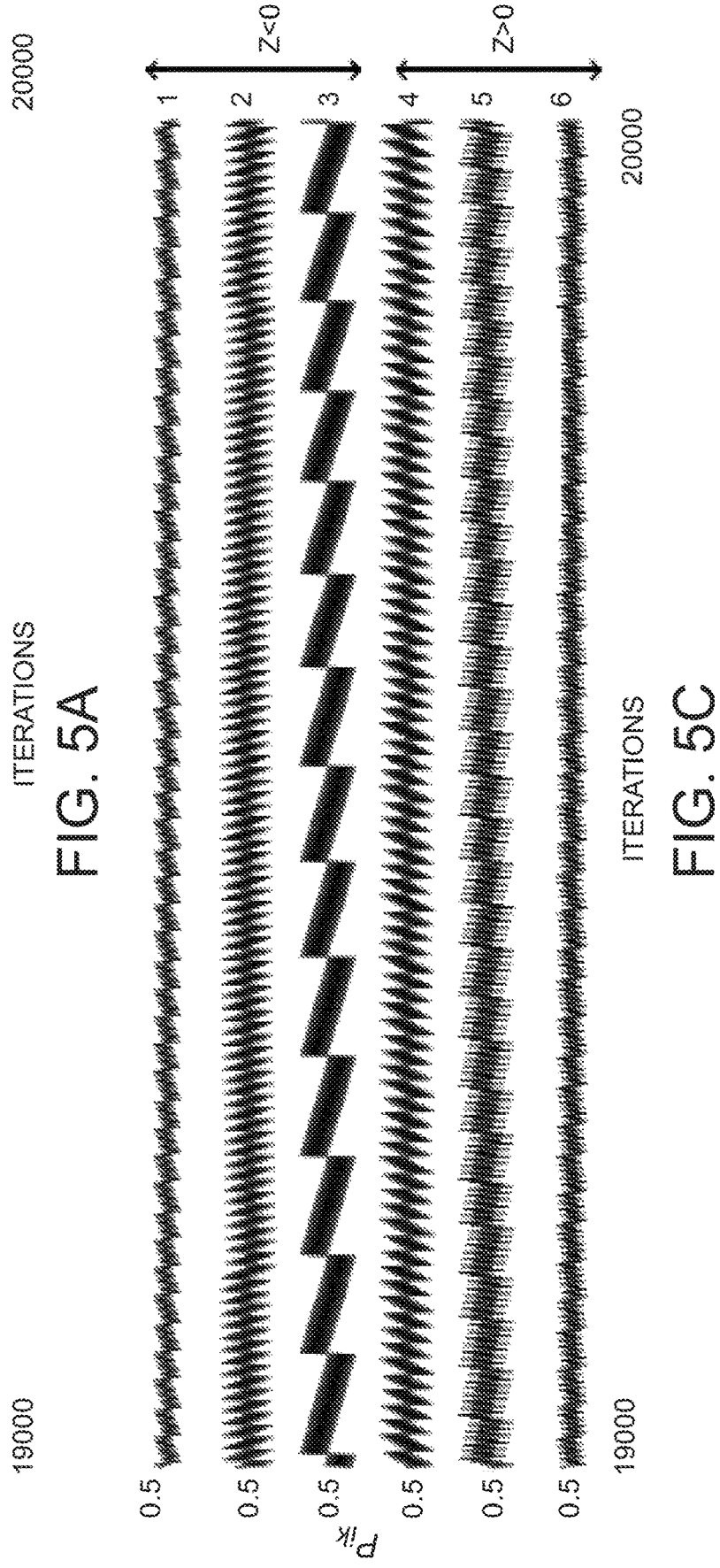
FIG. 5C is a graph showing a $\Sigma\Delta$ limit cycle corresponding to the neurons highlighted in FIG. 4C, sorted according to the neuron's margin of separation from the classification boundary of FIG. 4C.
Figure 7A:
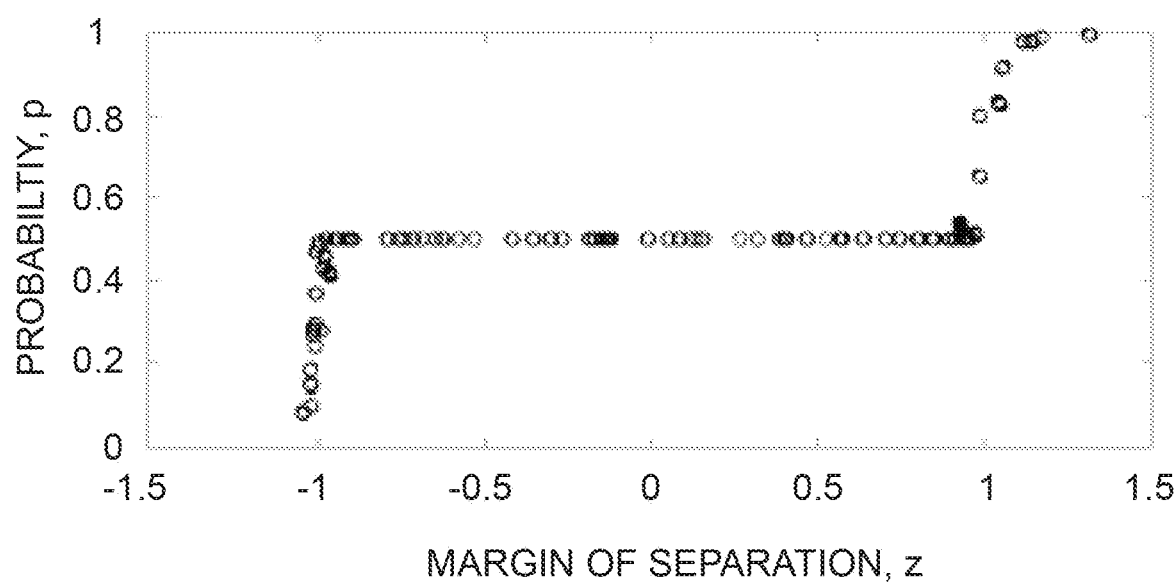
FIG. 7A is a graph showing a scatter plot between the variables $p_{ik}$ and the margin of separation $z_{ik}$ showing that at equilibrium, the network satisfies Eqn. (11) corresponding to the $\Sigma\Delta$ SVM as its first-order condition.

This model was been verified as illustrated in FIG. 7A that shows a plot of $p_{ik}$ against $z_{ik}$ for a noisy case of the problem in illustrated in FIG. 4C over multiple iterations for all the points of a particular class when the network has converged to a steady state. The graph closely follows the mapping $\Psi(.)$ shown in the graphical approach in FIG. 4A. In addition to encoding the classification margin, the dynamics of the network also exhibit noise-shaping properties similar to that of a $\Sigma\Delta$ modulator.

Noise-shaping refers to the mechanism of shifting the energy contained in quantization noise and interference out of the spectral regions where the desired information is present. Using the mechanism of noise-shaping, $\Sigma\Delta$ modulators and biological neuronal networks can achieve encoding that can track the input stimuli with very high-fidelity. Previous attempts towards connecting principles of noise-shaping with learning resulted in networks with relatively simple feed-forward topologies, to ensure network stability. However, by construction, the dynamics of the proposed growth-transform neural network is always stable irrespective of the choice of the positive-definite interconnection matrix Q.

FIGS. 8A, 8B, 8C, 8D, 8E, 8F, 8G, and 8H show the noise-shaping characteristics corresponding to neurons labeled 1-8 located at different margins with respect to the classification boundary. These noise-shaping plots were obtained by first extracting a segment of each neuron's output $S_{ik}$ (using a Hamming window) and then applying a 4096-point fast-Fourier transform (FFT) to the extracted segment. The FFT magnitudes were then averaged over multiple time segments to obtain the final noise-shaping response. The results shown in FIGS. 8A, 8B, 8C, 8D, 8E, 8F, 8G, and 8H illustrate that the dynamics of the support vectors exhibit a noise-shaping characteristic similar to that of a $\Sigma\Delta$ modulator, where energy is shifted out of a frequency band.

Figure 6B:
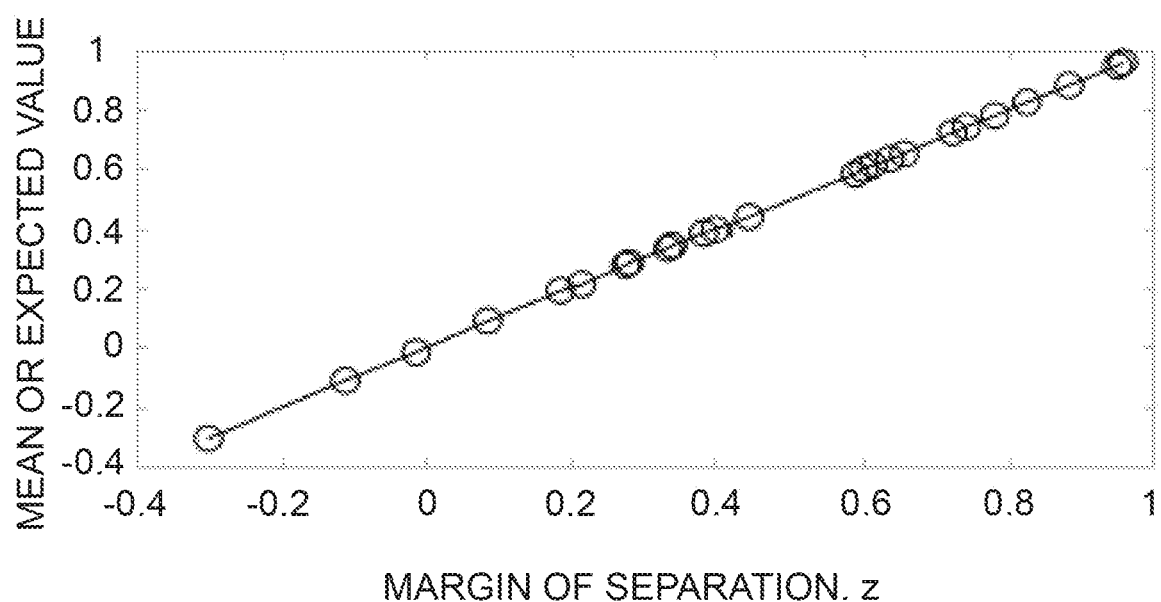
FIG. 6B is a graph showing the mean of the neuron output $S_{ik}$ as a function of the margin of separation of the support vector neurons illustrated in FIG. 4C.
Figure 8A:
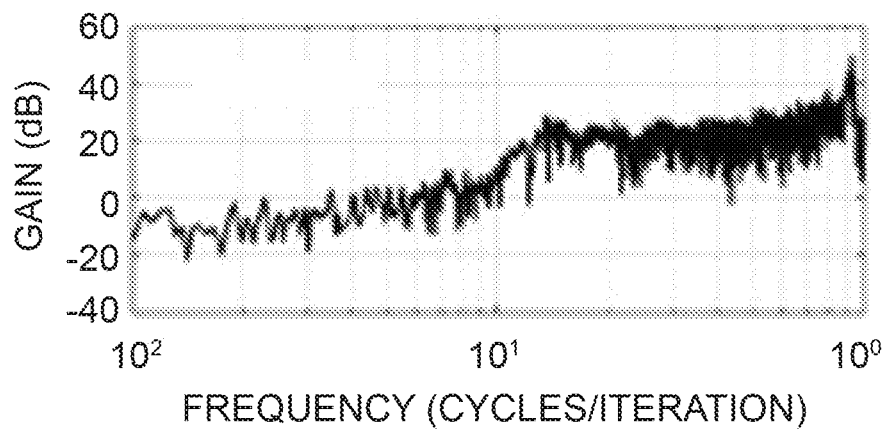
FIG. 8A is a spectrum of a first neuron denoted as 1 on the classification space of FIG. 8I.
Figure 8B:
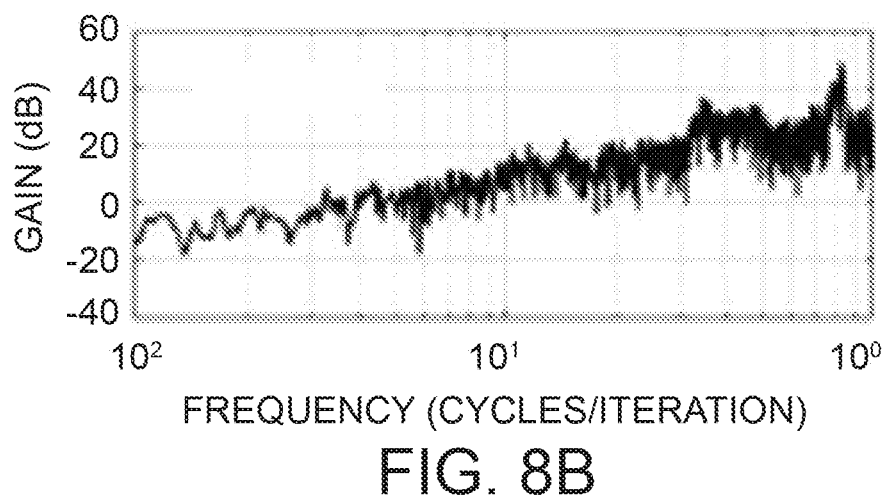
FIG. 8B is a spectrum of a second neuron denoted as 2 on the classification space of FIG. 8I.
Figure 8C:
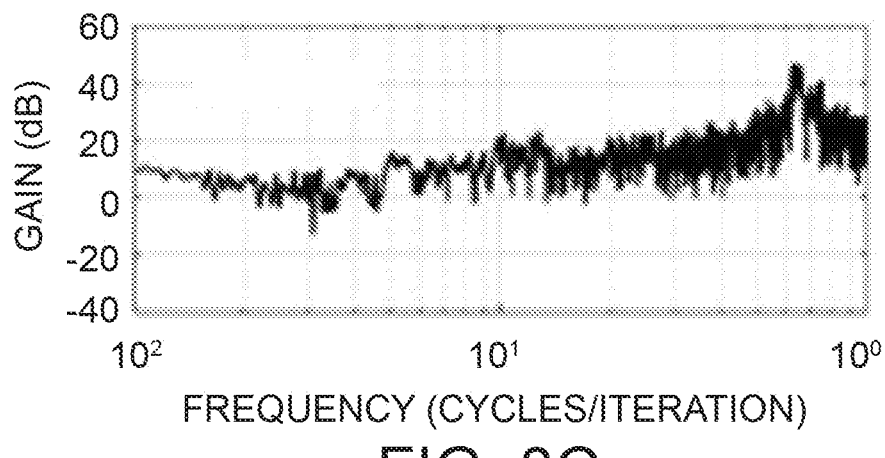
FIG. 8C is a spectrum of a third neuron denoted as 3 on the classification space of FIG. 8I.
Figure 8D:
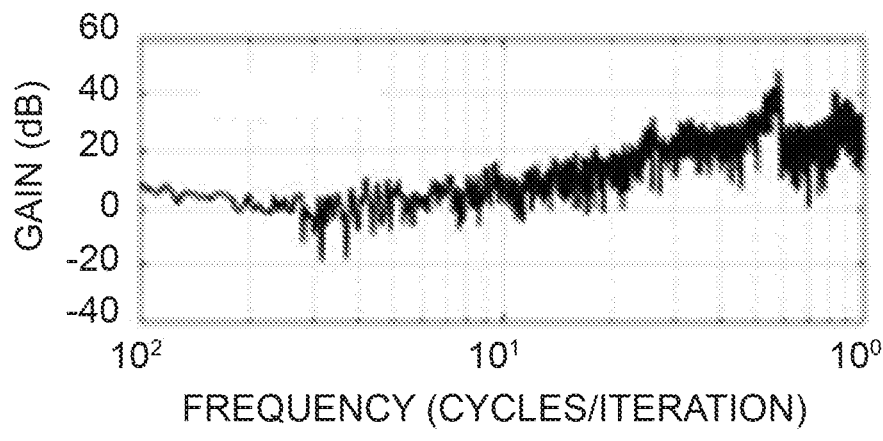
FIG. 8D is a spectrum of a fourth neuron denoted as 4 on the classification space of FIG. 8I.
Figure 8E:
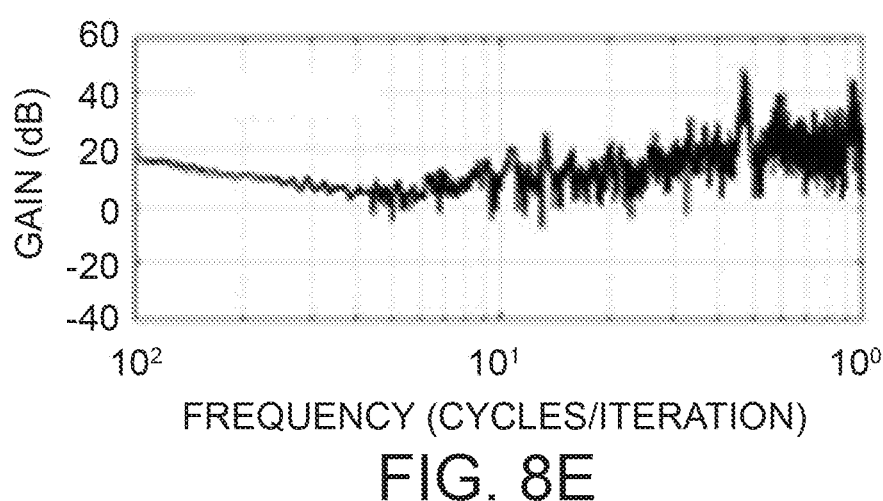
FIG. 8E is a spectrum of a fifth neuron denoted as 5 on the classification space of FIG. 8I.
Figure 8F:
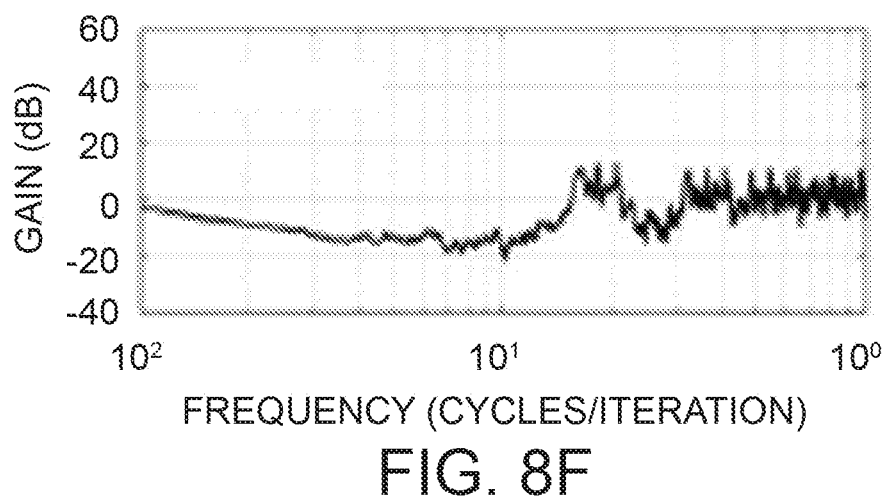
FIG. 8F is a spectrum of a sixth neuron denoted as 6 on the classification space of FIG. 8I.
Figure 8G:
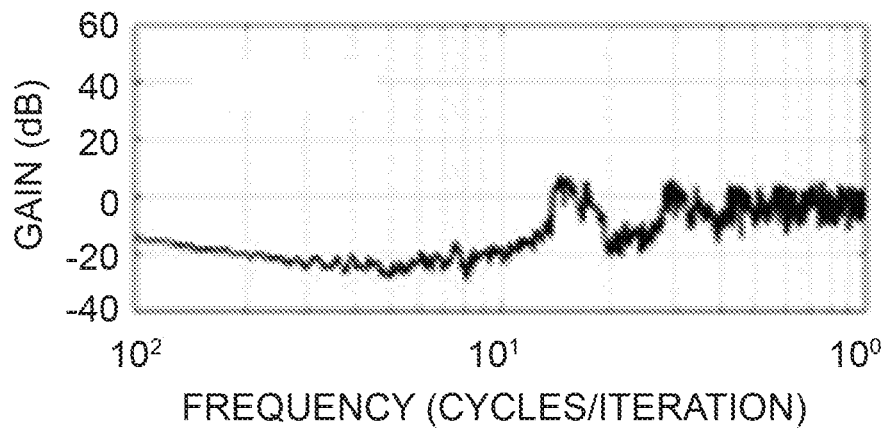
FIG. 8G is a spectrum of a seventh neuron denoted as 7 on the classification space of FIG. 8I.
Figure 8H:
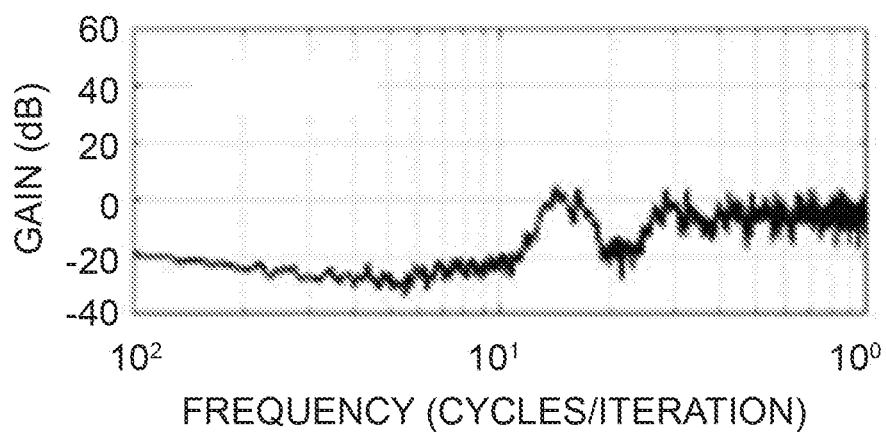
FIG. 8H is a spectrum of an eighth neuron denoted as 8 on the classification space of FIG. 8I.
Figure 8I:
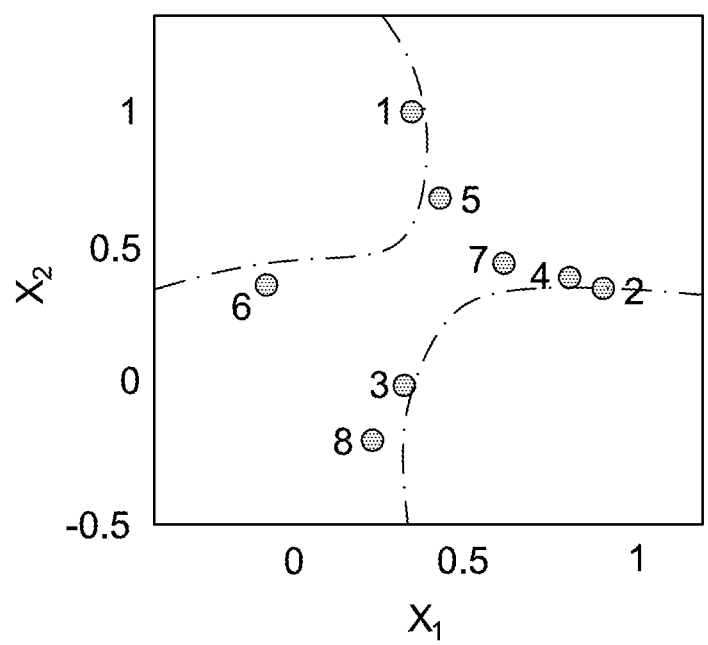
FIG. 8I is a graph showing a classification space that includes the neurons illustrated in FIGS. 8A, 8B, 8C, 8D, 8E, 8F, 8G, and 8H, in which each neuron is located at different margins with respect to the classification boundary.

FIG. 8I shows a graph of the neurons 1-8 (see FIGS. 8A, 8B, 8C, 8D, 8E, 8F, 8G, and 8H) mapped to the classification space. For neurons on the classification boundary, such as neuron 2, the quantization noise was shifted away from DC frequency whereas for other neurons, the quantization noise is shifted away from a frequency band located away from DC frequency. This result is explained from the observation that the output of the neuron encodes the margin of classification, as shown in FIG. 6B. For a neuron located on the classification boundary, the classification margin is approximately zero and the neuron learns to shape the quantization noise out of the DC frequency band. For the neurons located away from the classification boundary, the noise-shaping shifts to a higher frequency and the degree of noise-shaping becomes less pronounced with the noise floor becoming more flat. Like $\Sigma\Delta$ modulation, the encoding of the classification margin by the growth-transform neurons is also robust to noise.

Figure 7B:
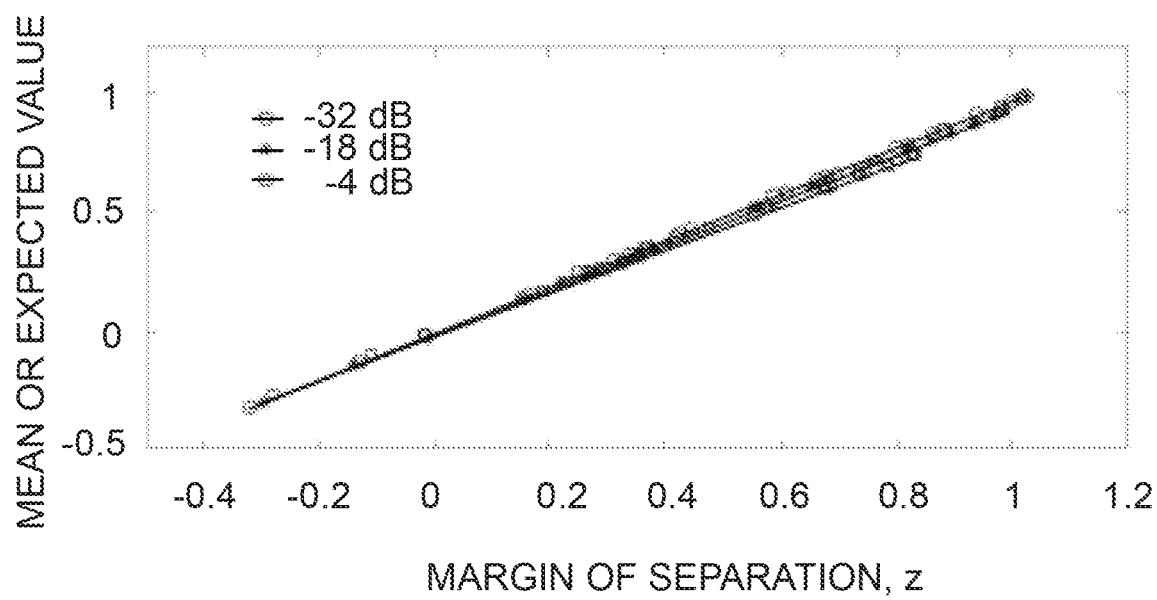
FIG. 7B is a graph showing the mean of the neuron output $S_{ik}$ as a function of the margin of separation of the support vector neurons for different levels of uniform random noise inserted into the update.

This phenomenon is illustrated by the results shown in FIG. 7B, where different amounts of white-noise are introduced into the threshold of the neural output function $S_{ik}=\text{sgn}(p_{ik}-0.5)$ in the updated Eqn. (26). As the noise level becomes higher, the encoding becomes poorer away from the margin and the encoded value falls short of the margin, although the nearest support vectors still encode the margin with a high degree of accuracy.

III. Spiking and Bursting Support Vector Machines

In various other aspects, the growth transform neural network is incorporated into the design of support vector machine (SVM) characterized by spiking or bursting responses. The switching dynamics of the spiking/bursting SVMs are modified using a variation of the potential function. In particular, if $\Phi(.)$ is chosen to be non-convex, spiking dynamics are generated by the network of growth-transform neurons.

Figure 9A:
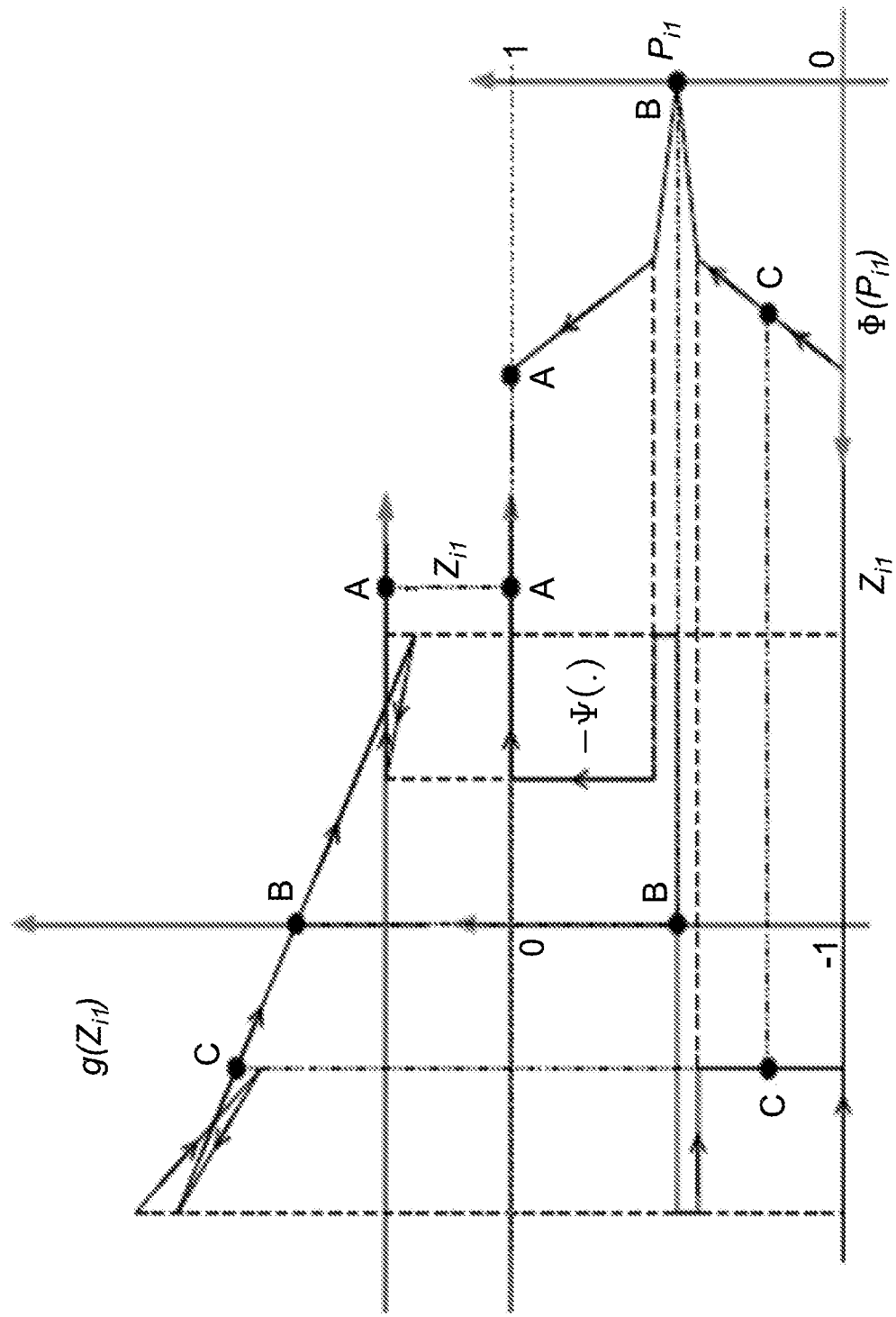
FIG. 9A is a graph showing a primal loss function and the corresponding dual potential function for a spiking SVM where the spiking response leads to a primal loss function with hysteresis.

By way of non-limiting example, the potential function $\Phi(.)$ as shown in FIG. 9A was used as a basis for estimating a corresponding mapping function $\Psi(p_{ik})$ using the geometric approach. This mapping function is non-linear and exhibits impulses (or spikes) located symmetrically on either side of the classification boundary at z=0. The corresponding primal loss-function exhibits a hysteresis-like behavior as shown in FIG. 9A. The trajectory of each neuron during the process of optimization is also shown, where each neuron generates a spike (or an impulse) as it transitions through the hysteresis loops. Note that by operating in the dual-optimization space, the growth-transform neuron operates on a much simpler cost-function as opposed to the hysteretic primal-loss function.

Figure 9B:
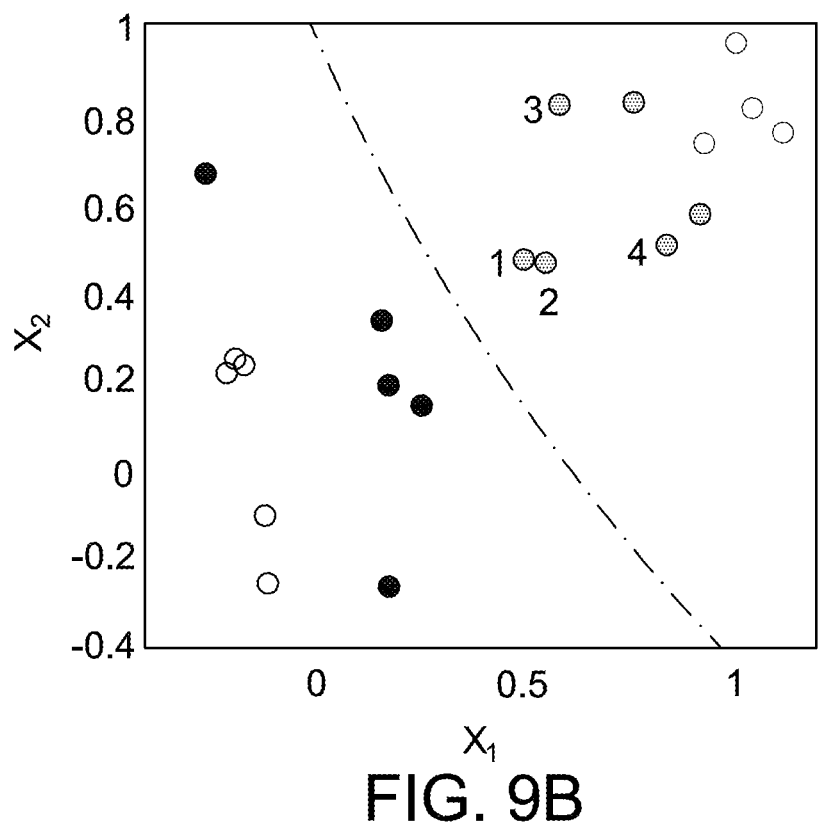
FIG. 9B is an illustration of a classification space showing a classification boundary produced by a spiking SVM for a linearly separable two-class problem that remains unchanged when compared to outputs of GiniSVM (FIG. 2B) and ΣΔ SVM (FIG. 4B).
Figure 9C:
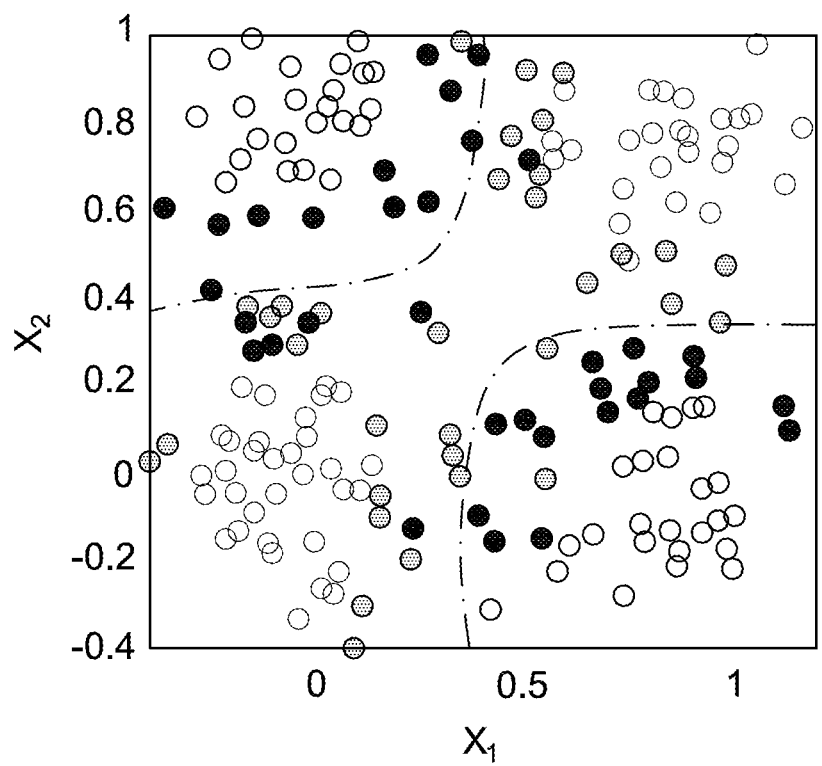
FIG. 9C is an illustration of a classification space showing a classification boundary produced by a spiking SVM for a nonlinearly separable two-class problem that remains unchanged when compared to outputs of GiniSVM (FIG. 2C) and ΣΔ SVM (FIG. 4C).
Figure 10:
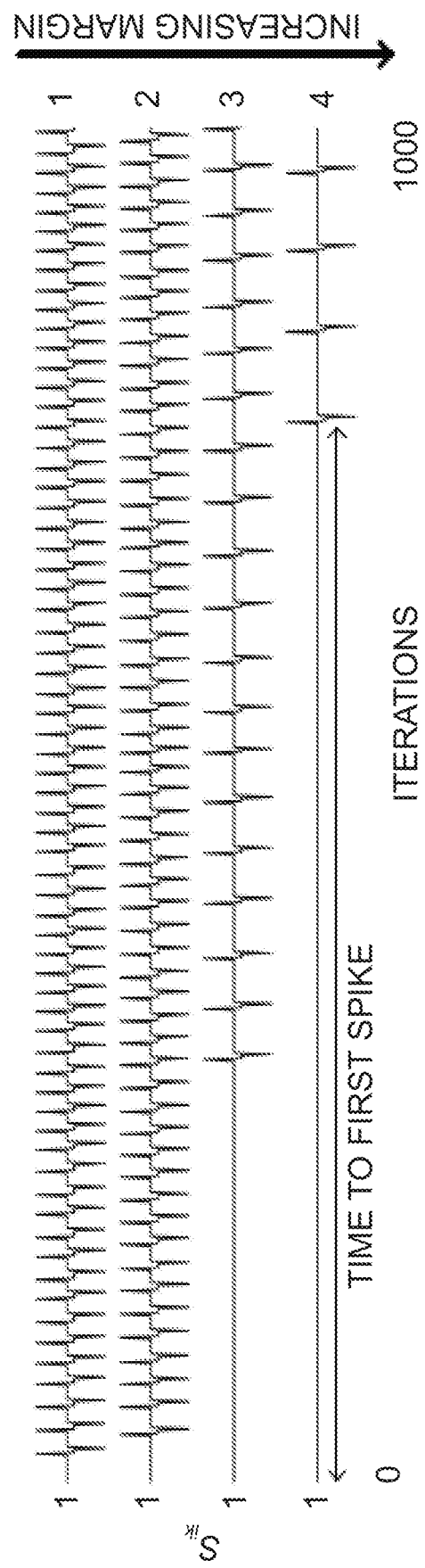
FIG. 10 is a graph showing a network response of the support vectors denoted 1, 2, 3, and 4 in FIG. 9B, and showing spiking dynamics as a function of the margin of separation.

FIGS. 9B and 9C show the classification contours for a two-dimensional linear and non-linear synthetic classification task, respectively. The introduction of the non-linearity in the transition region does not affect the classification boundaries or performance. The resulting spike-trains generated by different neurons (located at different classification margins) are shown in FIG. 10 for the system illustrated in FIG. 9B.

Figure 11A:
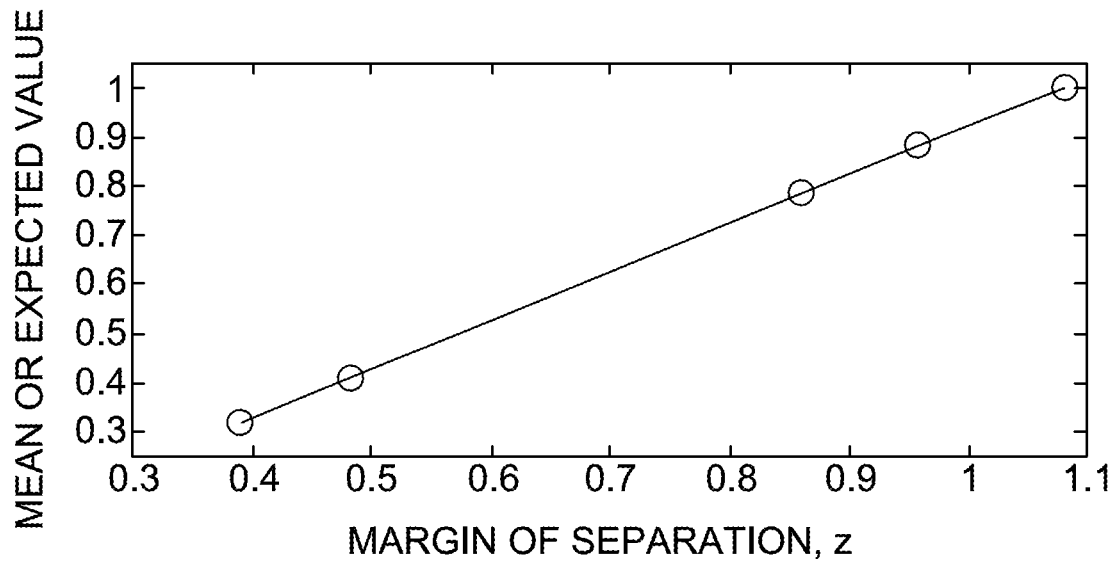
FIG. 11A is a graph showing the mean of the neuron output $S_{ik}$ as a function of the margin of separation of the support vector neurons illustrated in FIG. 9B.
Figure 11B:
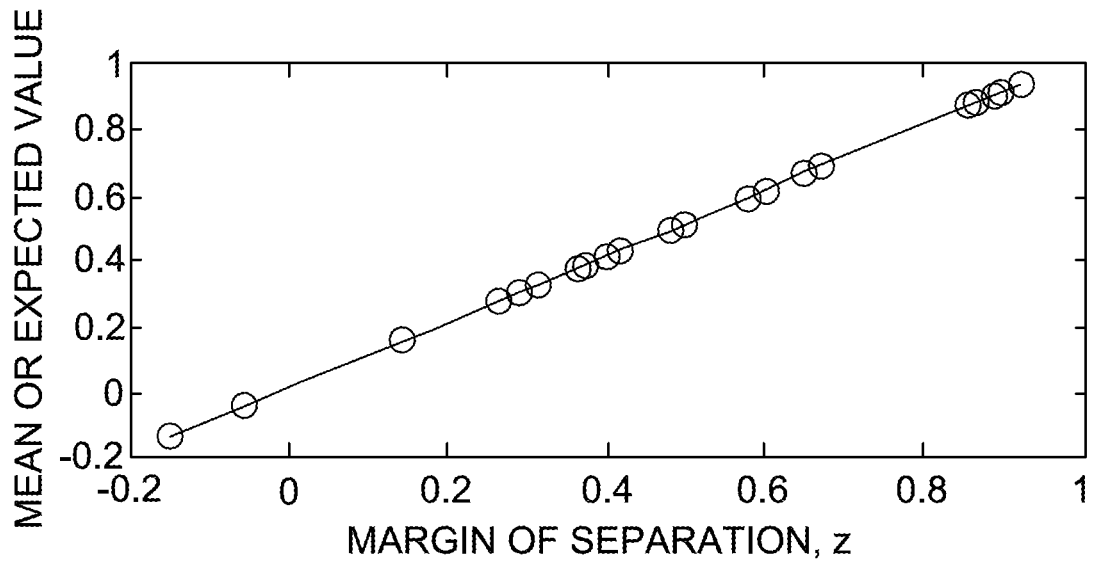
FIG. 11B is a graph showing the mean of the neuron output $S_{ik}$ as a function of the margin of separation of the support vector neurons illustrated in FIG. 9C.

Similar to the $\Sigma\Delta$ SVM, the expected value of the output $S_{ik}$ for individual neurons also encodes the margin of separation, as shown in FIGS. 11A and 11B for the two systems of FIGS. 9B and 9C. Therefore, the neuron model given by Eqn. (31) holds for the case of spiking SVMs as well. The dynamics of the spiking SVM show a number of other encoding properties that are similar to those observed in biological neural networks. For example, mean firing rate over time is one rate coding scheme in which the spiking frequency or rate increases with the intensity of stimulus. By way of another non-limiting example, temporal encoding, such as time-to-first-spike, assumes that the first spike generated after the onset of stimulus contains information, and that the time-to-first-spike is smaller for a stronger stimulus. As illustrated in FIG. 10, the spiking SVM model exhibits modulation in the spiking behavior in the rate of spikes as well as the time-to-first-spike.

The stimuli used were binary labels assigned to the neurons that determine the network configuration for a given classification problem, and the strength of the stimulus is higher for neurons closer to the classification hyperplane (i.e., for the 'support vectors'). As the margin of separation z from the hyperplane decreased, the spiking rate for a support vector increases and it starts spiking earlier in the convergence process.

Figure 12A:
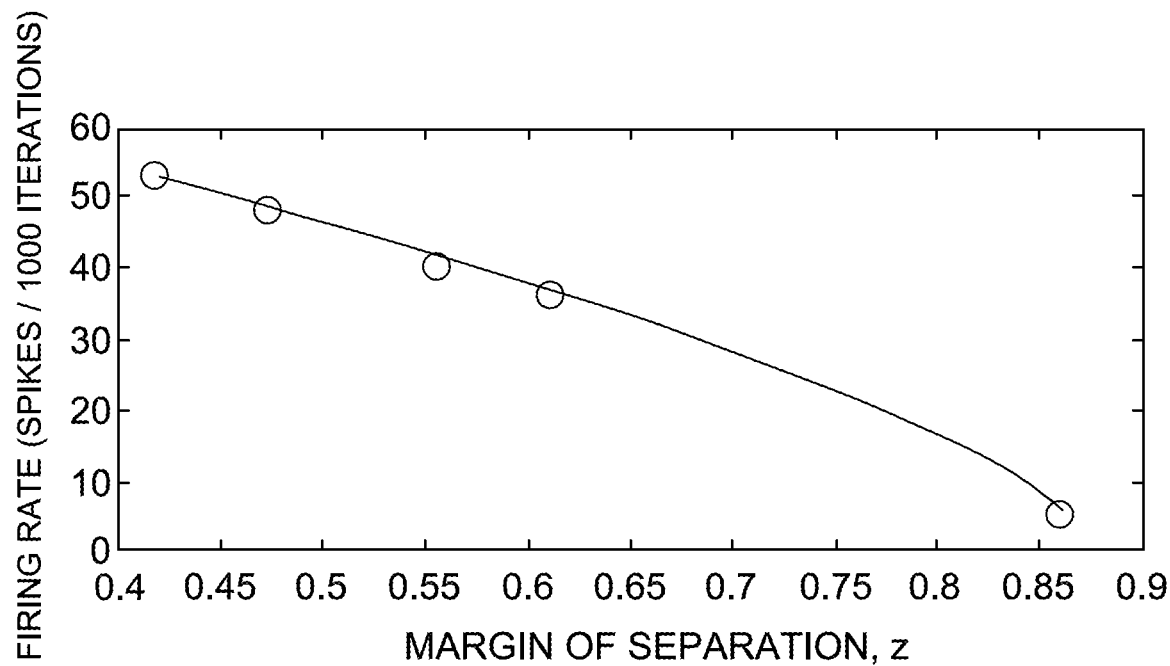
FIG. 12A is a graph showing the firing rate as a function of the margin of separation for support vectors of one of the classes of FIG. 9B.
Figure 12B:
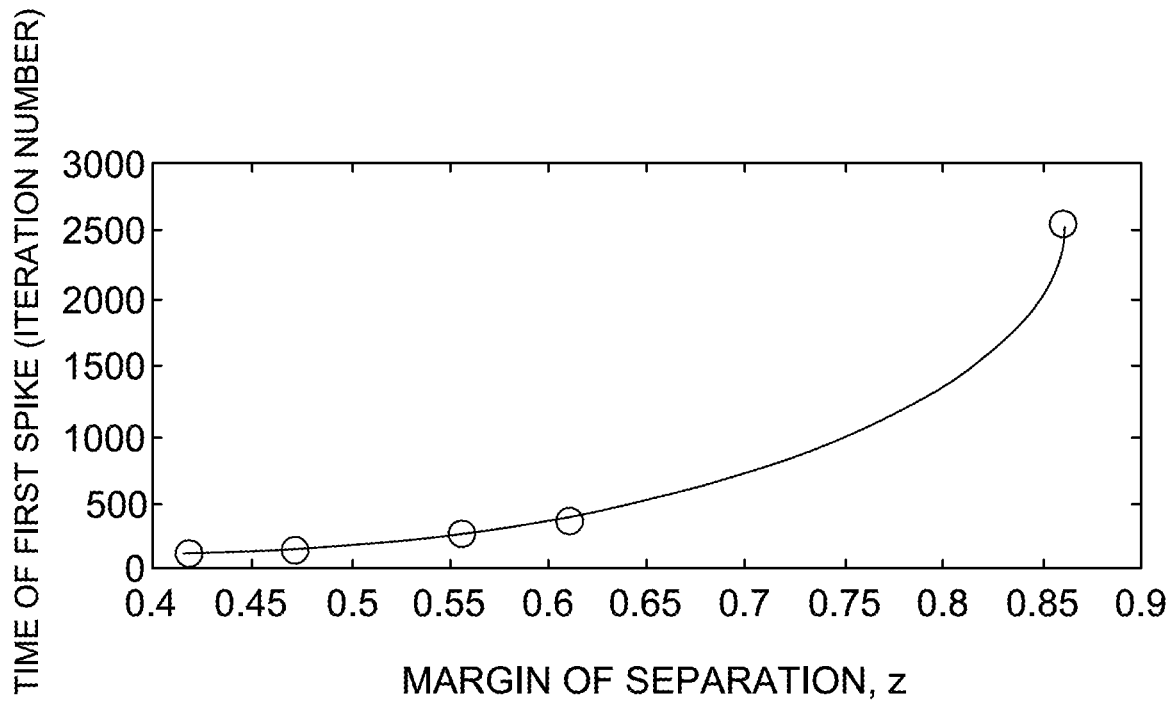
FIG. 12B is a graph showing the time to first spike as a function of the margin of separation for support vectors of one of the classes of FIG. 9B.

FIGS. 12A and 12B show that the firing rate (number of spikes per 1000 iterations) monotonically decreases and the time (iteration count) to the first spike monotonically increases with the margin of separation, respectively. T\Without being limited to any particular theory, the nearer a neuron is to the classification hyperplane, the more its relative contribution in determining the weight vectors and the faster it reaches the transition region around p=½, leading to the spiking response. The spikes thus represent a manifestation of the process of convergence, and are directly related to the learning behavior of the dynamical system through the support vectors (i.e., the vectors that are the most useful in learning the classification boundary).

In an aspect, the spiking potential function is modulated to change the spiking dynamics across the population. For a particular support vector neuron, the spiking rate decreases with an increase in the slope of the transition region at the classification boundary, as expressed by W (see Table I below).

TABLE 1

Potential functions for different SVMs and the classification results for the 'adult' dataset.

| SVM | Potential function $\Phi(p_{ik})$ | Tr. Error (%) | Cross-val. Error (%) |
|---|---|---|---|
| Sigma-Delta SVM | $\left\|p_{ik} - \frac{1}{2}\right\|$ | 3.1 | 17.1 |
| Spiking SVM[1] | $W_\epsilon + \left\|p_{ik} - \left(\frac{1}{2} - \epsilon\right)\right\|, \ 0 \leq p_{ik} < \frac{1}{2} - \epsilon$ <br> $W\left\|p_{ik} - \frac{1}{2}\right\|, \ \frac{1}{2} - \epsilon \leq p_{ik} \leq \frac{1}{2} + \epsilon$ <br> $W_\epsilon + \left\|p_{ik} - \left(\frac{1}{2} + \epsilon\right)\right\|, \ \frac{1}{2} + \epsilon < p_{ik} \leq 1$ <br> where $W > 1$ and $\epsilon > 0$. | 12.1 | 16.3 |
| Bursting SVM[2] | $W_1 \epsilon_1 + \left\|p_{ik} - \left(\frac{1}{2} - \epsilon_1\right)\right\|, \ 0 \leq p_{ik} < \frac{1}{2} - \epsilon_1$ <br> $W_1 \left\|p_{ik} - \frac{1}{2}\right\|, \ \frac{1}{2} - \epsilon_1 \leq p_{ik} < \frac{1}{2}$ <br> $W_2 \left\|p_{ik} - \frac{1}{2}\right\|, \ \frac{1}{2} \leq p_{ik} < \frac{1}{2} + \epsilon_2$ <br> $W_2 \epsilon_2 + \left\|p_{ik} - \left(\frac{1}{2} + \epsilon_2\right)\right\|, \ \frac{1}{2} + \epsilon_2 < p_{ik} \leq 1$ <br> where $W_1, W_2 > 1$ and $\epsilon_1, \epsilon_2 > 0$ | 11.7 | 16.4 |
| GiniSVM | $\left(p_{ik} - \frac{1}{2}\right)^2$ | 3.4 | 16.8 |

By way of non-limiting example, three SVMs were developed using potential functions with differing values of W, as illustrated in FIG. 13A. The corresponding limit cycles showing steady-state spiking behaviors and classification plots for each of the SVMs are shown in FIGS. 13B, 13C, and 13D, respectively. All three networks learned the same classification boundary, but with different spiking dynamics. The spiking nature of this SVM remained the same for non-linearly separable problems as well.

Figure 14A:
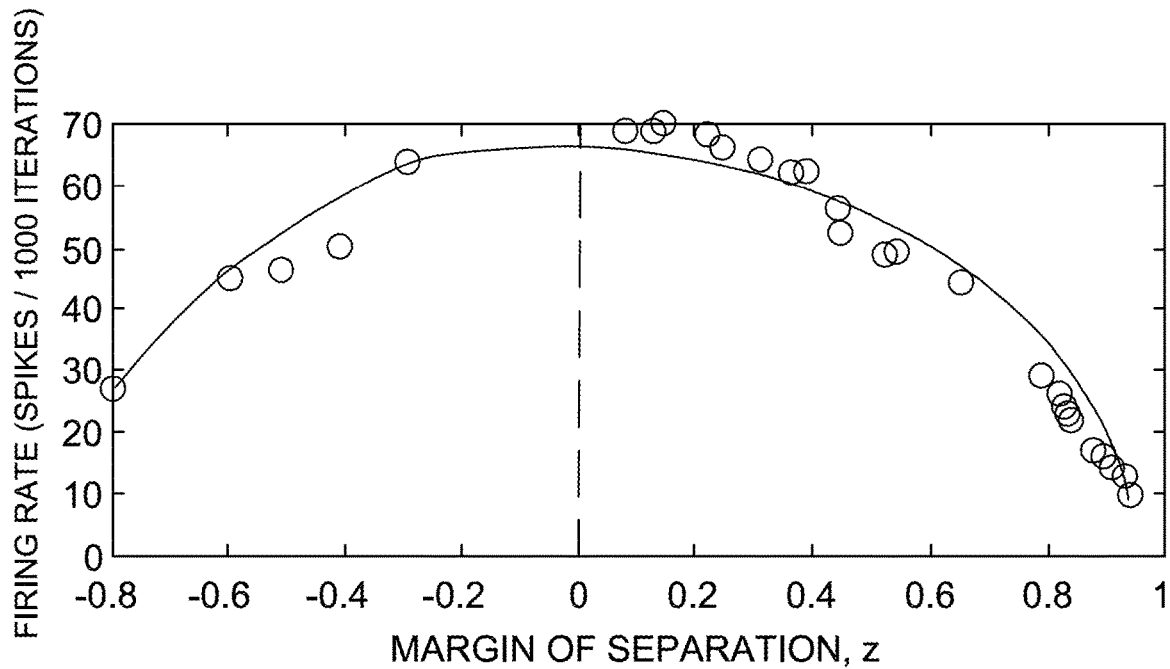
FIG. 14A is a graph showing the firing rate as a function of the margin of separation for support vectors of one of the classes for support vectors of the non-linearly separable two-class problem illustrated in FIG. 9C. The gray dotted line denotes the classification boundary (z=0).
Figure 14B:
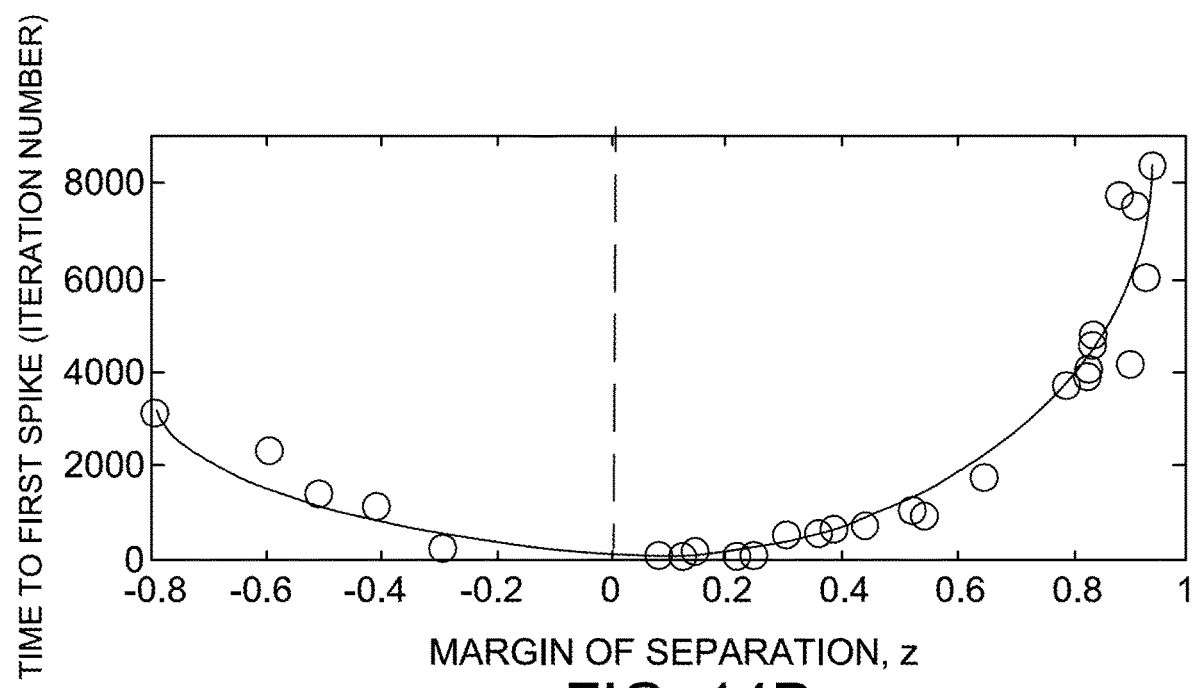
FIG. 14B is a graph showing the time to first spike as a function of the margin of separation for support vectors of one of the classes for support vectors of the non-linearly separable two-class problem illustrated in FIG. 9C. The gray dotted line denotes the classification boundary (z=0).

The classification boundary for the non-linear classification example using the spiking SVM is shown in FIG. 9C and the corresponding firing rate and time-to-spike plots are given in FIGS. 14A and 14B. The firing rate dropped and the time to spike increased away from the classification boundary on both sides. Although not as monotonic as the plots for the linearly separable case, the spiking dynamics remained similar, with the highest firing rates and lowest times-to-first-spike recorded at the points closest to the margin.

Figure 15A:
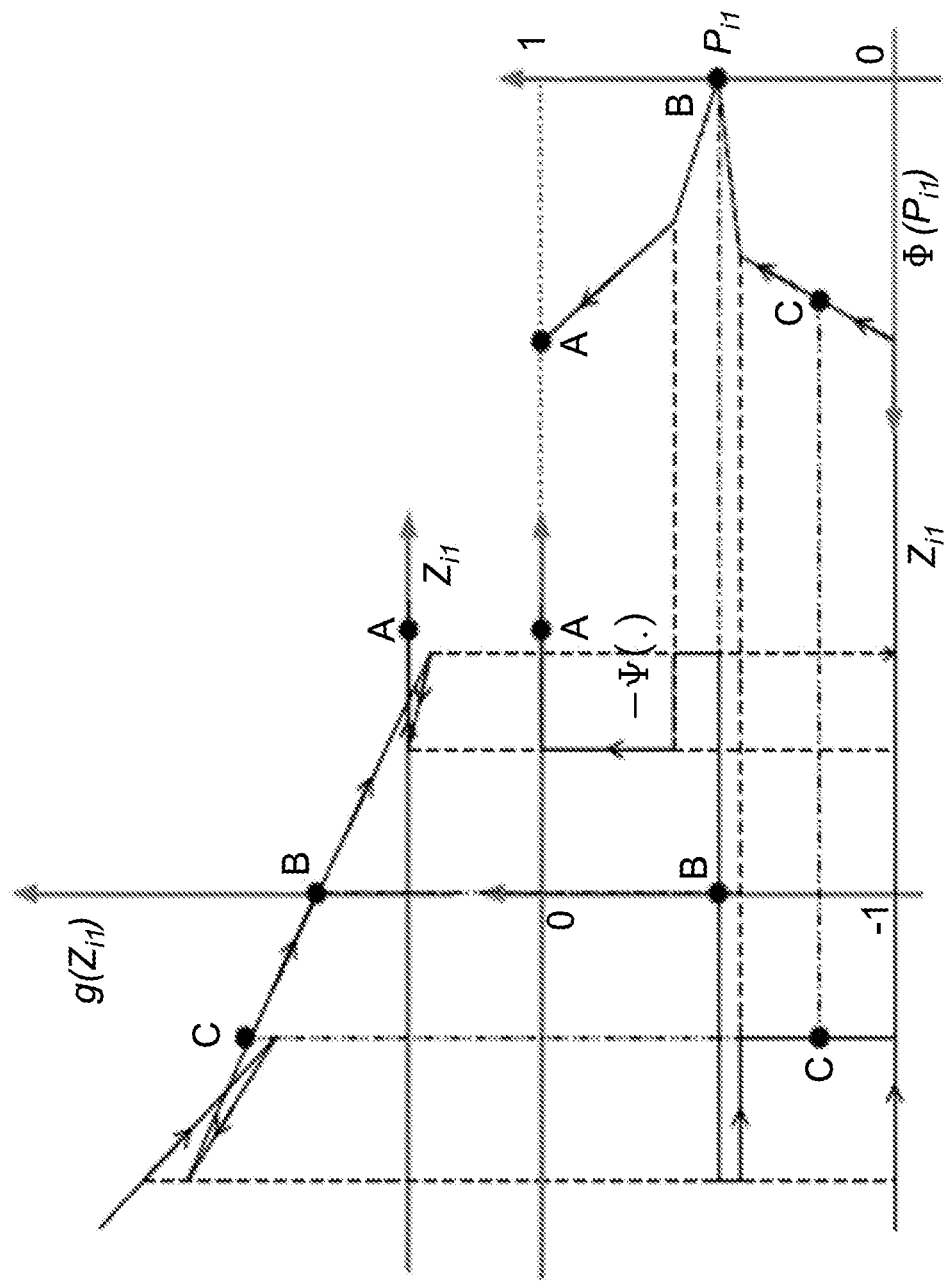
FIG. 15A is a graph showing a primal loss function and the corresponding dual potential function for a bursting SVM which produces bursting dynamics.

In various other aspects, the growth transform neural network is incorporated into the design of bursting support vector machine (SVM) characterized by spiking and bursting responses. The switching dynamics of bursting SVM is modified using a variation of the potential function shown in Table 1, in which the previous potential function is made asymmetric by making the upward and downward transition slopes and their widths unequal as shown in FIG. 15A. This asymmetry in the potential function leads to a burst-like steady state response in the support vectors as shown in FIG. 16 for the classification problem in FIG. 15B. The bursting response is also similar to the dynamics that have been observed in biological neurons.

Figure 15B:
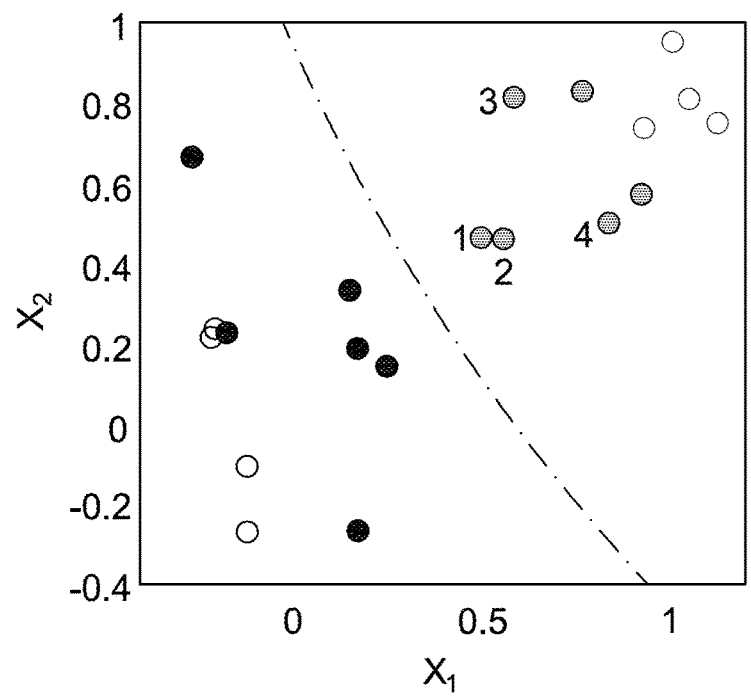
FIG. 15B is an illustration of a classification space showing a classification boundary produced by a bursting SVM for a linearly separable two-class problem.
Figure 15C:
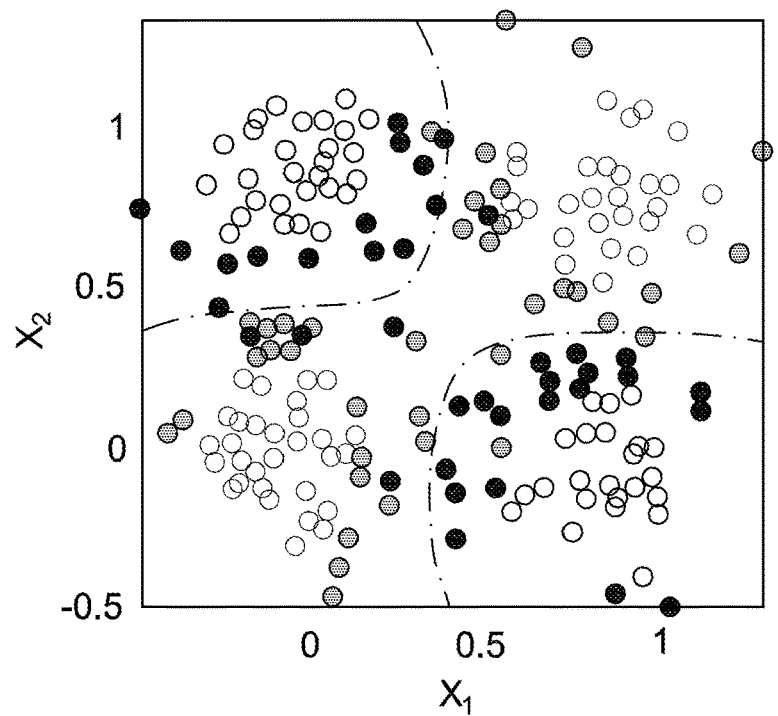
FIG. 15C is an illustration of a classification space showing a classification boundary produced by a bursting SVM for a nonlinearly separable two-class problem.
Figure 16:
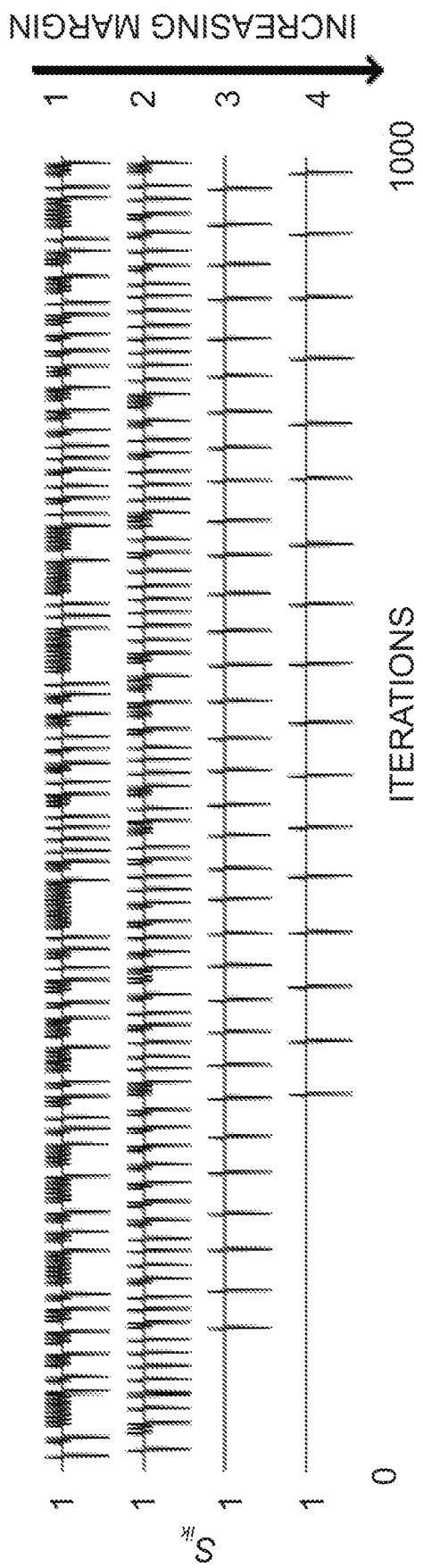
FIG. 16 is a graph showing a network response of the support vectors denoted 1, 2, 3, and 4 in FIG. 15B, and showing bursting dynamics as a function of the margin of separation.
Figure 17A:
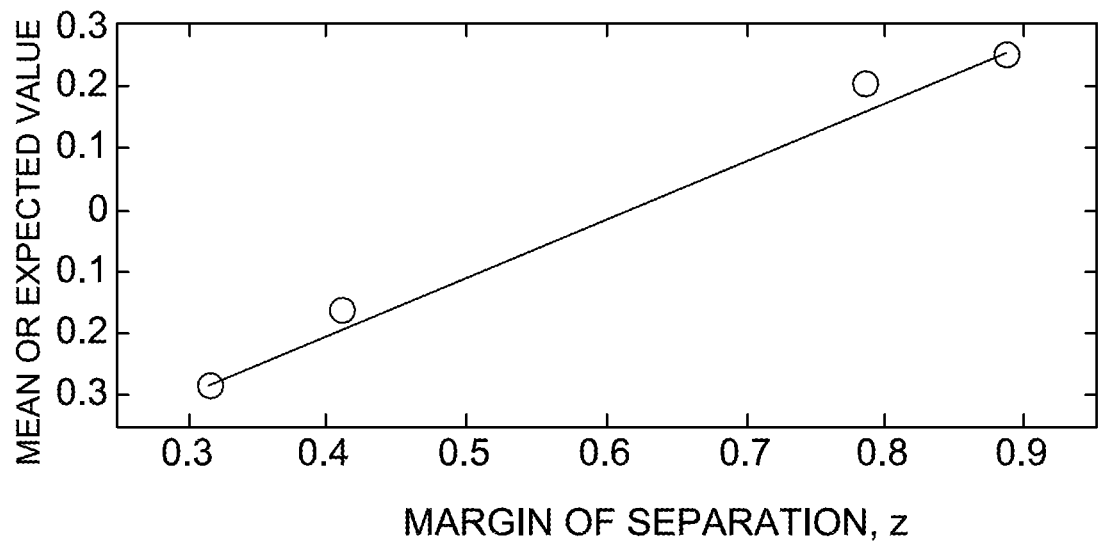
FIG. 17A is a graph showing the mean of the neuron output $S_{ik}$ as a function of the margin of separation of the support vector neurons illustrated in FIG. 15B.
Figure 17B:
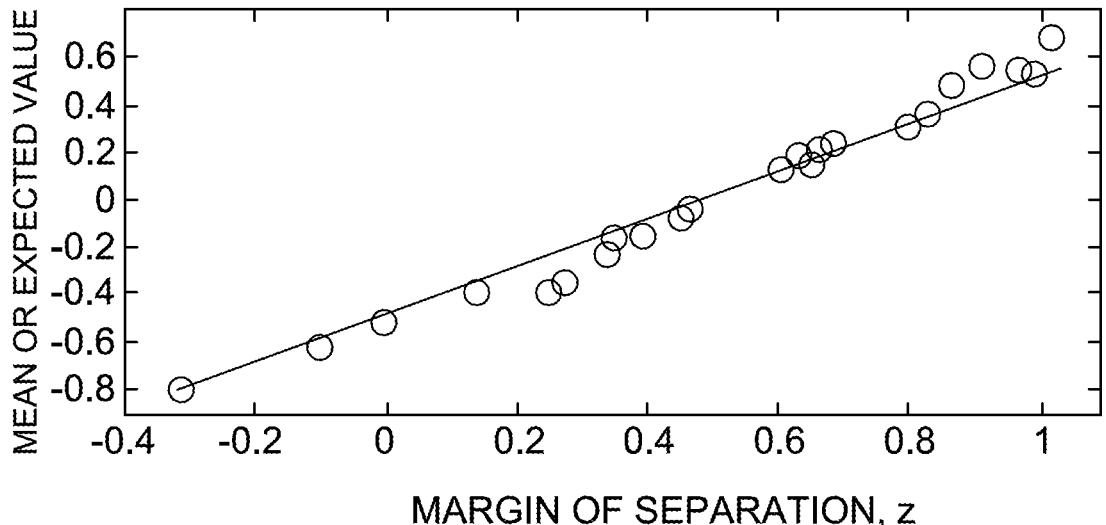
FIG. 17B is a graph showing the mean of the neuron output $S_{ik}$ as a function of the margin of separation of the support vector neurons illustrated in FIG. 15C.

The mean value of the output $S_{ik}$ of the neurons plotted against the margin variable for the support vectors are given in FIGS. 17A and 17B corresponding to the problems in FIGS. 15B and 15C respectively. The graphs are not as linear as in the case of spiking SVM, presumably due to the loss of anti-symmetry in the structure of the bursting mapping function around 0.5. As in the spiking SVM, the burst patterns were changed by varying the parameter values in the potential function.

Figure 18A:
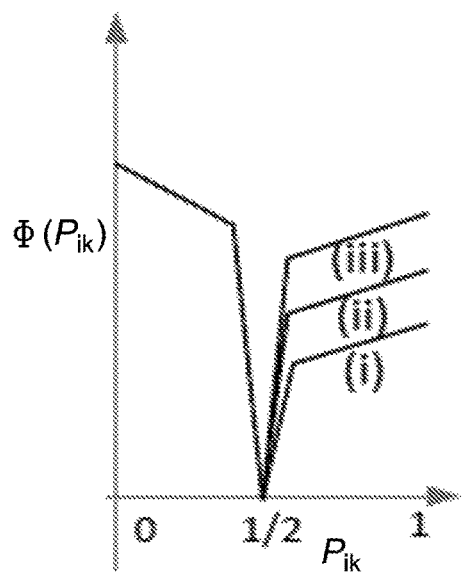
FIG. 18A is a graph showing three versions of potential functions, each with a different value of $W_2$.
Figure 18B:
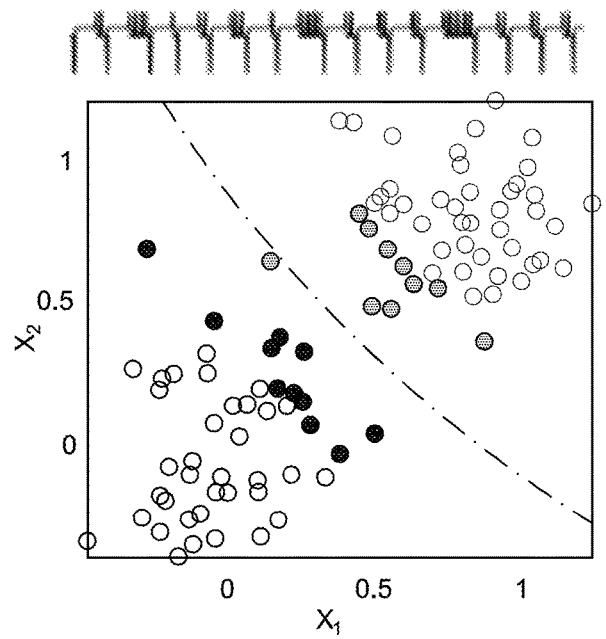
FIG. 18B is a limit cycle (above) and classification space (below) corresponding to a first potential function (i) of FIG. 18A.
Figure 18C:
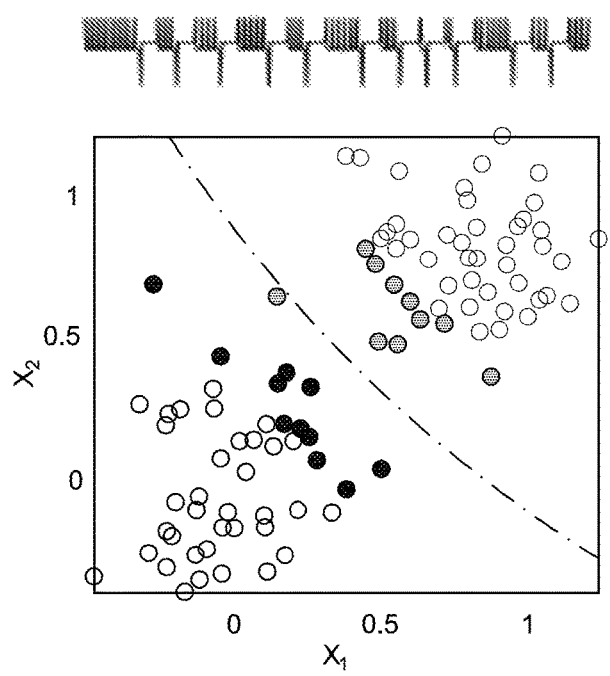
FIG. 18C is a limit cycle (above) and classification space (below) corresponding to a second potential function (ii) of FIG. 18A, illustrating that burst rate and the magnitudes of the spikes were adapted while keeping the classification performance (or boundaries) similar to those of FIG. 18B.
Figure 18D:
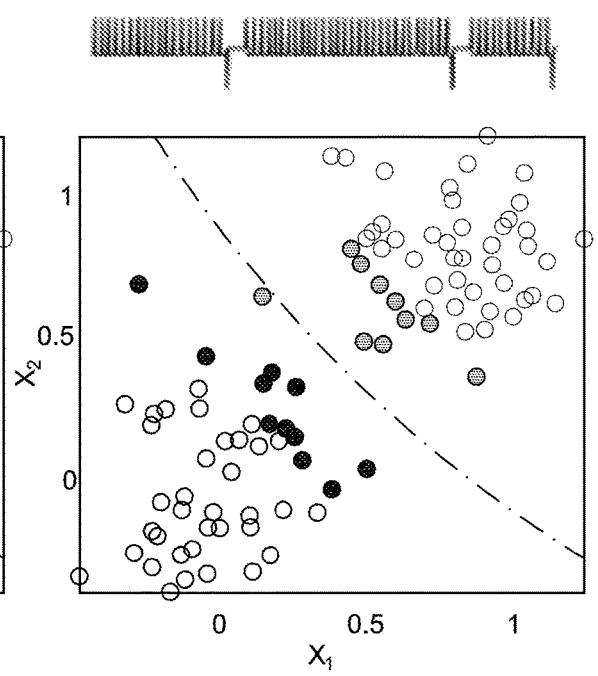
FIG. 18D is a limit cycle (above) and classification space (below) corresponding to a third potential function (iii) of FIG. 18A, illustrating that spiking rate and the magnitudes of the spikes were adapted while keeping the classification performance (or boundaries) similar to those of FIG. 18B and FIG. 18C.

By way of non-limiting example, three SVMs were developed using potential functions with differing values of $W_2$ as illustrated in FIG. 18A. The corresponding limit cycles showing steady-state spiking behaviors and classification plots for each of the SVMs are shown in FIGS. 18B, 18C, and 18D, respectively. All three networks learned the same classification boundary, but with different spiking dynamics. In particular, the burst width and spike frequency varied for the different SVMs (see FIGS. 18B, 18C, and 18D).

In various aspects, methods of solving a general class of problems given in Eqn. (1) for different types of the network mapping function $\Psi(.)$, and hence $\Theta(.)$ were described. A geometric approach was described for solving primal-dual optimization problems using a novel growth transform neuron model that asymptotically satisfies Eqn. (1) as an equivalent first-order condition. This geometric framework was then shown to be applicable for generating different types of support vector networks with different dynamical properties ranging from $\Sigma\Delta$ modulation to spiking and bursting.

One insight that emerged from the disclosed geometric framework is that, while each individual neuron is optimizing a relatively simple dual cost function, the network as a whole exhibits complex dynamics corresponding to primal loss-functions with hysteresis and discontinuities. In each of the support vector networks that incorporate the disclosed growth transform neural networks as described above, irrespective of the nature of the output ($\Sigma\Delta$ modulation, spiking or busting), the output of the neuron faithfully encodes an equivalent classification margin. In all described networks, those neurons located in close proximity (with respect to the classification margin) to the classification boundary exhibit switching dynamics. Also, the switching rates (for example spiking rates) increased for neurons located close to the classification boundary, implying that the network self-optimizes for energy (switching energy) based on the significance of the neuron.

While the systems described herein were demonstrated using simple two-dimensional synthetic problems (for the ease of visualization), it is to be understood that the results are suitable for larger and more complex tasks. By way of non-limiting example, Table I summarizes the classification results of different variants of switching SVMs, trained and evaluated on a benchmark 'Adult (a3a)' dataset. The training dataset (3185 instances) and testing dataset (29376 instances) provided on the LIBSVM website were used for training and cross-validation respectively. The classification accuracies produced by the different SVM variants are comparable to each other and comparable to previously reported classification results for this specific dataset. The geometric framework described herein provides a useful tool to connect existing machine learning models to neuromorphic principles like noise-shaping, spiking and bursting and hence pave the way towards designing scalable neuromorphic processors based on growth transform neuron models.

In another aspect, in the context of a probability regression framework, a two-class SVM solves a system objective according to:

$$\min_{p_i^+, p_i^-} \sum_{\gamma=+,-} [\sum_{i=1}^N \sum_{j=1}^N Q_{ij}(p_i^\gamma - y_i^\gamma)(p_j^\gamma - y_j^\gamma) + \sum_{i=1}^N \Omega(p_i^\gamma)] \quad (32)$$

under the constraints:

$$p_i^+ + p_i^- = 1 \quad (33)$$

and $$p_i^+, p_i^- \geq 0 \quad (34)$$

where i corresponds to the index of an input data vector or a support vector neuron and $y_i^+$, $y_i^-$ correspond to the a-priori probabilities (or labels) associated with each of the two classes (denoted as + and −).

The first term in the cost function minimizes a kernel distance between the class labels and the probability variables $p_i^+$, $p_i^-$, and the second term minimizes a cumulative potential function $\Omega(.)$ corresponding to each neuron. The kernel or the interconnection matrix Q is a positive definite matrix such that each of its elements is written as an inner-product in a high-dimensional space as $Q_{ij} = \Psi(x_i) \cdot \Psi(x_j)$ where $x_i \in R^D$ correspond to the input data vector and $\Psi(.)$ represents a high-dimensional mapping function.

A growth transformation is used for connecting the system objective to the model of the neuron described in FIG. 3 by using the first order condition of Eqn. (32) with respect to $p_i^\gamma$ and the following transformations:

$$b_i^\gamma = -\sum_{j=1}^N Q_{ij} y_j^\gamma, \gamma = +, - \quad (35)$$

$$f(S_i^\gamma) = \Phi^{-1}\left(\frac{1}{T}\int_{t=0}^{t=T} S_i^\gamma(t)dt\right) \quad (36)$$

$$\Omega(p_i^\gamma) = \int \Phi(p_i^\gamma) dp_i^\gamma \quad (37)$$

Due to the positive-definite property of the interconnection matrix Q, each of the neurons i, i=1 . . . N, in the network is mapped to a vector $x_i$ in a metric space $R^D$, providing an alternate geometric representation of the neural network. Then, the margin variable given by:

$$z_i^+ = -\sum_j Q_{ij} p_j^+ + b_i^+ \quad (38)$$

$$= \left(\sum_j \Psi(x_j) p_j^+\right) \cdot \Psi(x_i) + b_i^+ \quad (39)$$

represents the distance (or the margin) of the vector $x_i$ (hence the neuron) from a classification hyper-plane located in a high-dimensional coordinate space.

A simple two-class, two-dimensional, linearly separable classification problem is used to illustrate different spiking dynamics produced by a growth-transform neural network. Starting from a well-defined initial state, the network optimizes the system objective function given in Eqn. (32) and as a result each neuron in the network produces its own unique spiking dynamics. FIG. 19A shows the classification boundary ($z^+ = -z^-$) produced by the network where each data point correspond to a neuron in the network. FIG. 19B shows the spike-trains generated by four different neurons located at different margins with respect to the classification boundary. The shape of each individual spike is determined by the form of the potential function $\Omega(.)$ in the system objective function Eqn. (32). The observed spiking dynamics for this simple classification problem reveals several interesting encoding properties similar to those observed in biological neural networks.

The expected value of the output $S_i^+$ for each individual neuron faithfully encoded its margin of separation from the classification boundary, as shown in FIG. 19C. This result demonstrated that even the exact shape of the spikes can accurately transmit information about the topology of the network and the underlying objective function.

Figure 19D:
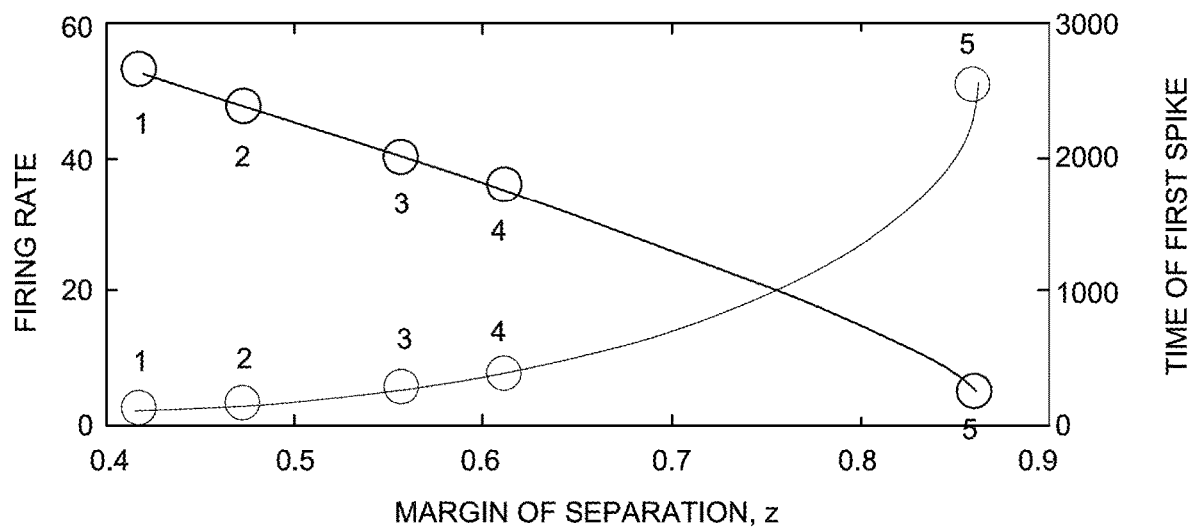
FIG. 19D is a graph showing the firing rate and time-to-first-spike plots for the support vector neurons illustrated in FIG. 19A as a function of their margin of separation.

The spiking SVM model modulates its information using both the mean-firing-rate and time-to-first-spike encoding. Mean firing rate over time is a widespread rate coding scheme that claims that the spiking frequency or rate increases with the intensity of stimulus. A temporal code like time-to-first-spike, on the other hand, claims that the first spike after the onset of stimulus contains all the information, and the time-to-first-spike is smaller for a stronger stimulus. For an SVM formulation, the input stimuli are determined by the class labels (a-priori probabilities) which determine the network configuration (location of each individual neuron with respect to the boundary for a given set of labels). The modulation in the SVM network as shown in FIG. 19D showed that the firing rate (number of spikes in a time-window) monotonically decreased and the time to first spike monotonically increased with the margin of separation for the problem in FIG. 19A. The support vector neurons (or neurons close to the classification boundary) exhibit spiking behavior, whereas the nonsupport vectors do not exhibit spiking. Thus, the spikes are used to encode the information near the classification boundary, which enhances recognition and discrimination by the system.

Figure 19E:
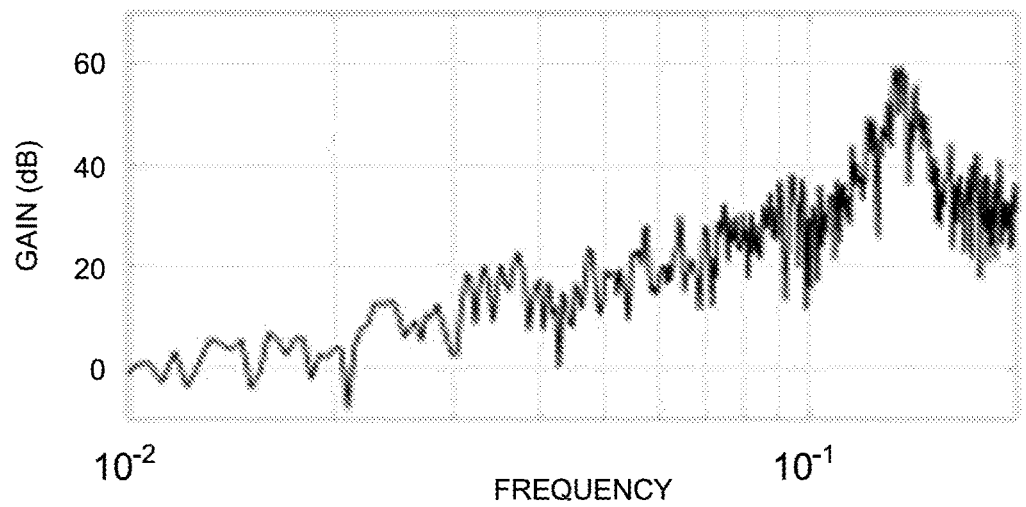
FIG. 19E is a graph showing a frequency spectrum of the response of the support vector neurons denoted by a "1" in FIG. 19A, summarizing the emergent noise-shaping behavior for the neuron.

In another aspect, the spiking SVM learned to exhibit noise-shaping, another spectral property observed in biological neuronal networks. Noise-shaping is characterized by neurons shifting the energy contained in noise and interference out of frequency bands where target information is present. For a spiking SVM, more discriminatory information is encoded by the neurons closer to the classification boundary and a spectral plot of one of these neurons clearly reveals the noise-shaping, as shown in FIG. 19E. The peak in the frequency response corresponds to the fundamental spike frequency of the neuron. Due to noise-shaping, the noise-floor within the frequency-band of interest is reduced and moved to higher frequencies.

In another aspect, the dynamical properties are conserved when the SVM is scaled to a larger and a more complicated classification problem. By way of non-limiting example, the spiking SVM was applied to solve two benchmark UCI datasets 'Heart disease (Cleveland)' and 'Diabetes'. The classification results using 5-fold cross-validation are summarized in Table 2, along with results obtained from literature which use variants of support vector machines. The datasets are labeled with (N, d), where N denoted the number of instances (i.e. neurons) and d denotes the dimension of the feature vector. The 'Heart disease' dataset was used as a binary dataset to distinguish only presence from absence of the disorder. The classification accuracies produced by the spiking SVM were comparable to previously reported results.

Figure 20:
FIG. 20 is a graph showing a raster plot of the spiking behavior of 'support vector' neurons arranged in the increasing order of margin of separation for the UCI 'Heart disease' dataset. Non-spiking neurons (i.e., non-support vectors) are not shown. The solid black line (z=0) indicates the classification hyperplane, spike trains above it are from incorrectly classified neurons (z<0) and those below are from correctly classified neurons (z>0).

A raster plot of spiking neurons (i.e., the 'support vectors') arranged in the increasing order of margin of separation is shown in FIG. 20 for the 'Heart' dataset. It is seen that the firing rate drops and the time-to-first-spike increases away from the classification boundary (z=0) on both sides. Although not as monotonic as the plots for the linearly separable case, the spiking dynamics remain similar, with the highest firing rates and lowest times-to-first-spike recorded for the points closest to the margin.

TABLE 2

Classification Results on Benchmark Datasets Using Spiking SVM

| Dataset | Classification accuracies reported in literature (%) | Training Accuracy (%) | Cross-validation Accuracy (%) |
|---|---|---|---|
| Heart | 81.5 | 91.8 ± 1.1 | 79.4 ± 4.8 |
| Diabetes | 77.6, 82.05 | 80.4 ± 0.5 | 78.0 ± 4.7 |

A spiking neuron model based on growth transform updates demonstrates how the disclosed model is used for designing a large-scale spiking SVM capable of solving classification tasks with accuracies comparable to that of standard SVMs. The support vector network produced spiking dynamics that faithfully encoded an equivalent classification margin for each individual neuron using a combination of different spike-based encoding techniques. Neurons located close to the classification boundary were seen to exhibit these dynamics, and spiking rates increased for neurons with lower margins, implying that the network self-optimized for switching energy based on the relative importance of the neuron. The growth transform neural network serves as an important tool in connecting existing machine learning models to spiking neural networks and hence paves the way towards designing scalable neuromorphic processors.

Figure 21:
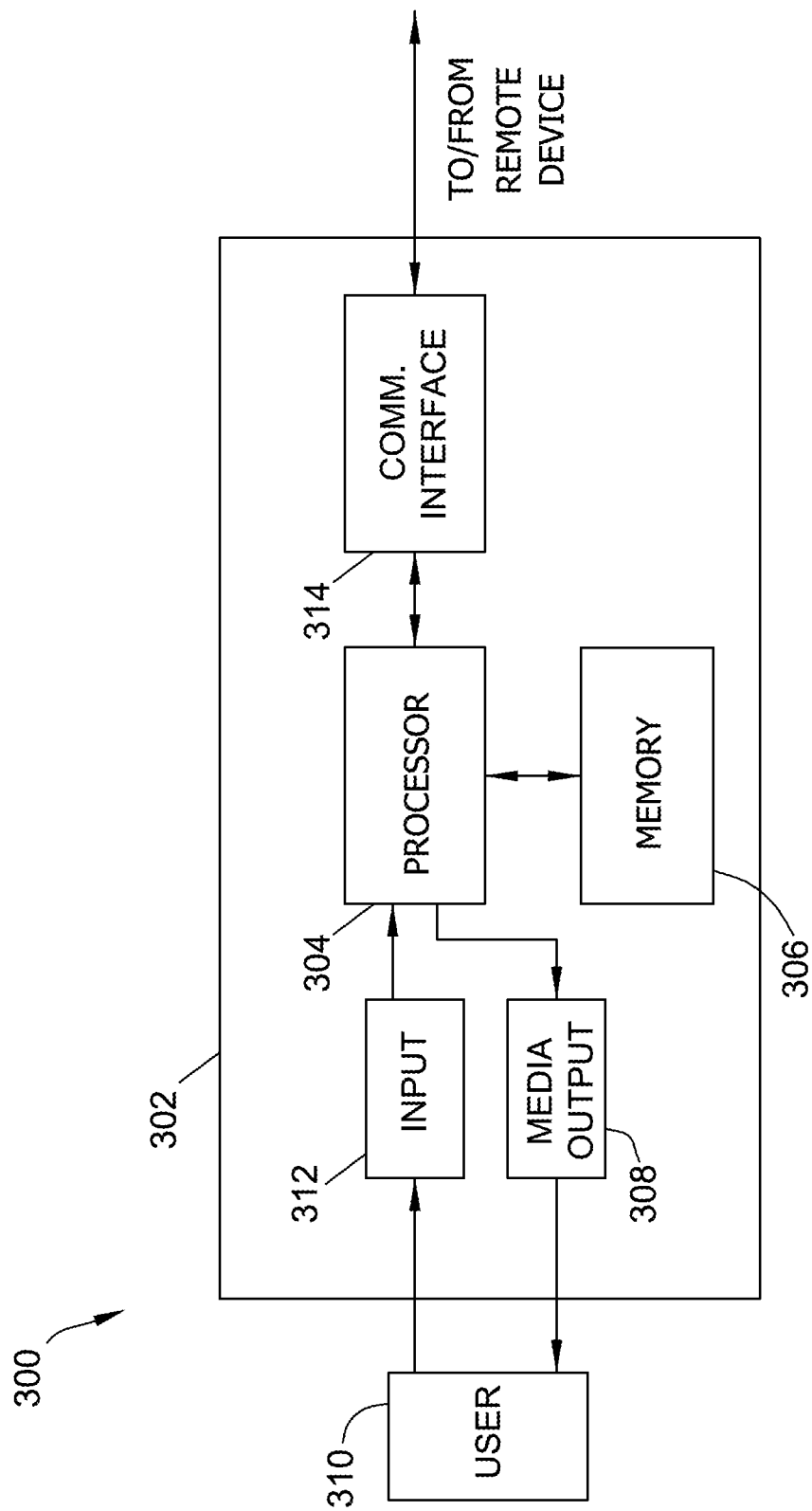
FIG. 21 is a schematic diagram showing an example configuration of a remote device system.

In various aspects, the methods described herein are implemented using a remote and/or local computing device as described herein below. FIG. 21 illustrates an example configuration of a remote device system 300 and depicts an exemplary configuration of a remote or user computing device 302, such as requestor computing device. Computing device 302 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or other data to be stored and retrieved. Memory area 306 may include one or more computer-readable media.

Computing device 302 also includes at least one media output component 308 for presenting information to a user 310. Media output component 308 is any component capable of conveying information to user 310. In some embodiments, media output component 308 includes an output adapter such as a video adapter and/or an audio adapter. An output adapter is operatively coupled to processor 304 and is operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 308 is configured to present an interactive user interface (e.g., a web browser or client application) to user 310.

In some embodiments, client computing device 302 includes an input device 312 for receiving input from user 310. Input device 312 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 308 and input device 312.

Computing device 302 may also include a communication interface 314, which is communicatively coupleable to a remote device such as SE computing device. Communication interface 314 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 306 are, for example, computer-readable instructions for providing a user interface to user 310 via media output component 308 and, optionally, receiving and processing input from input device 312. A user interface may include, among other possibilities, a web browser and client application. Web browsers enable users 310 to display and interact with media and other information typically embedded on a web page or a website from a web server associated with a merchant. A client application allows users 310 to interact with a server application.

Figure 22:
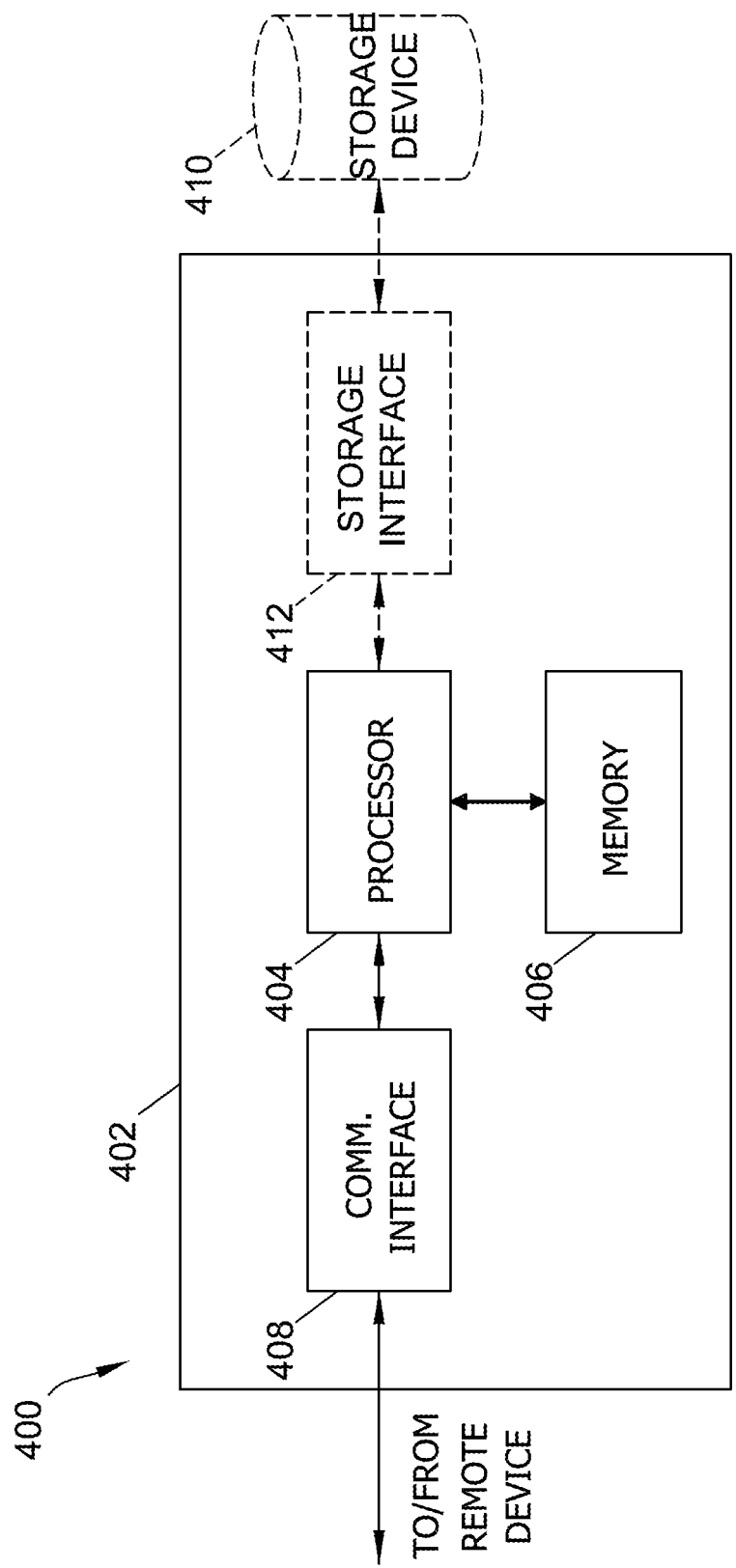
FIG. 22 illustrates is a schematic diagram showing a server system.

FIG. 22 illustrates an example configuration of a server system 400, and depicts an example configuration of a server computing device 402. Server computing device 402 includes a processor 404 for executing instructions. Instructions are stored in a memory area 406, for example. Processor 404 may include one or more processing units (e.g., in a multi-core configuration).

Processor 404 is operatively coupled to a communication interface 408 such that server computing device 402 is capable of communicating with a remote device such as computing device 302 shown in FIG. 21 or another server computing device 402. For example, communication interface 408 may receive requests from requestor computing device 106 via the Internet.

Processor 404 may also be operatively coupled to a storage device 410. Storage device 410 is any computer-operated hardware suitable for storing and/or retrieving data. In some embodiments, storage device 410 is integrated in server computing device 402. For example, server computing device 402 may include one or more hard disk drives as storage device 410. In other embodiments, storage device 410 is external to server computing device 402 and is accessed by a plurality of server computing devices 402. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 is operatively coupled to storage device 410 via a storage interface 412. Storage interface 412 is any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory areas 306 (shown in FIG. 21) and 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A growth transform neural network system comprising a computing device, the computing device comprising at least one processor and a memory storing a plurality of modules, each module comprising instructions executable on the at least one processor, the plurality of modules comprising:

a growth transform neural network module to define a plurality of mirrored neuron pairs comprising a plurality of first components and a plurality of second components each mirrored neuron pair comprising one first component and one second component connected by a normalization link wherein the plurality of first components are interconnected according to an interconnection matrix and the plurality of second components are interconnected according to the interconnection matrix, wherein each of the plurality of mirrored neuron pairs is associated with internal normalized variables p+ and p− that satisfy a normalization criterion of p++p−=1;

a growth transform module to update each first component of each mirrored neuron pair of a plurality of mirrored neuron pairs according to a growth transform neuron model; and a network convergence module to converge the plurality of mirrored neuron pairs to a steady state condition by solving a system objective function subject to at least one normalization constraint;

wherein the growth transform neuron model is mutually coupled with a network objective function of a machine learning model;

wherein each first component of each mirrored neuron pair is configured to receive a first external input and to produce a first output and each second component of each mirrored neuron pair is configured to receive a second external input and to produce a second output; and wherein the plurality of modules form a spiking support vector machine (SVM) and are are trained to cooperatively classify data input to the spiking SVM and to output a result of the classifying.

2. The growth transform neural network system according to claim 1, wherein the first component and the second component of each mirrored neuron pair in the steady state condition each produce a neuron response comprising a steady state value or a limit cycle with a neural dynamic according to a user-defined potential function, the neural dynamic comprising at least one of: $\Sigma\Delta$ modulation, noise-shaping, spiking, bursting, and sub-threshold oscillations.

3. The growth transform neural network system according to claim 1, wherein solving the system objective function comprises minimizing a dual-cost function.

4. The growth transform neural network system according to claim 1, wherein the growth transform neuron model is a polynomial growth transform with a normalization constraint.

5. The growth transform neural network system according to claim 1, wherein:

the first output is based on one or more of: the first external input, one or more additional first outputs produced by one or more additional first components as characterized by the interconnection matrix, convergence to the steady state condition, the user-defined potential function, and an update according to the growth transform model; and the second output is based on one or more of: the second external input, one or more additional second outputs produced by one or more additional second components as characterized by the interconnection matrix, the user-defined potential function, and convergence to the steady state condition.

6. The growth transform neural network system according to claim 5, wherein each first output and each second output encodes information characterizing at least one first or second external input, wherein the information is encoded by at least one output parameter selected from: a steady state value, a spiking rate, a burst frequency, a spike amplitude, a frequency spectrum, and a burst duration.

7. The growth transform neural network system according to claim 5, wherein a portion of the plurality of mirrored neuron pairs encodes information according to a population encoding scheme, wherein:

each first component of the portion is configured to produce a first population-encoded output based at least in part on the one or more additional first outputs produced by the one or more additional first components as characterized by the interconnection matrix; and each second component of the portion is configured to produce a second population-encoded output based at least in part on the one or more additional second outputs produced by the one or more additional second components as characterized by the interconnection matrix.

8. The growth transform neural network system according to claim 7, wherein the population encoding scheme is a synchrony scheme, wherein the portion of the plurality of mirrored neuron pairs produces at least one of:

the first population-encoded output after a first delay and subsequent to the one or more additional first outputs produced by the one or more additional first components as characterized by the interconnection matrix; and the second population-encoded output after a second delay and subsequent to the one or more additional second outputs produced by the one or more additional second components as characterized by the interconnection matrix, wherein the first delay and the second delay are at least one of predetermined fixed delays or variable delays.

9. The growth transform neural network system according to claim 8, wherein:

the first delay is a variable delay that varies based on one or more of: the first external input, one or more additional first outputs produced by one or more additional first components as characterized by the interconnection matrix, convergence to the steady state condition, the user-defined potential function, and an update according to the growth transform model; and the second delay is a variable delay that varies based on one or more of: the second external input, one or more additional second outputs produced by one or more additional second components as characterized by the interconnection matrix, the user-defined potential function, and convergence to the steady state condition.

10. A $\Sigma\Delta$ SVM comprising a growth transform neural network system, the growth transform neural network system comprising a computing device, the computing device comprising at least one processor and a memory storing a plurality of modules, each module comprising instructions executable on the at least one processor, the plurality of modules comprising:

a growth transform neural network module to define a plurality of mirrored neuron pairs comprising a plurality of first components and a plurality of second components interconnected according to an interconnection matrix, wherein each of the plurality of mirrored neuron pairs is associated with internal normalized variables p+ and p− that satisfy a normalization criterion of p++p−=1;

a growth transform module to update each first component of each mirrored neuron pair of a plurality of mirrored neuron pairs according to a growth transform neuron model; and a network convergence module to converge the plurality of mirrored neuron pairs to a steady state condition by solving a system objective function subject to at least one normalization constraint, wherein the first component and the second component of each mirrored neuron pair in the steady state condition each produce a neuron response comprising a steady state value or a limit cycle with $\Sigma\Delta$ modulation according to a user-defined potential function $\Phi(p_{ik})$ given by $\Phi(p_{ik}=|p_{ik}-\frac{1}{2}|$ wherein $P_{ik}$ is the response of $i^{th}$ neuron of the plurality of mirrored neuron pairs, and k is 1 or 2;

wherein the growth transform neuron model is mutually coupled with a network objective function of a machine learning model; and wherein the plurality of modules are trained to cooperatively classify data input to the spiking SVM and to output a result of the classifying.

11. The $\Sigma\Delta$ SVM according to claim 10, wherein solving the system objective function comprises minimizing a dual-cost function.

12. The $\Sigma\Delta$ SVM according to claim 10, wherein the growth transform neuron model is a polynomial growth transform with a normalization constraint.

13. The EA SVM according to claim 10, wherein:

each first component of each mirrored neuron pair is configured to receive a first external input and to produce a first output based on one or more of: the first external input, one or more additional first outputs produced by one or more additional first components as characterized by the interconnection matrix, convergence to the steady state condition, the user-defined potential function, and an update according to the growth transform model; and each second component of each mirrored neuron pair is configured to receive a second external input and to produce a second output based on one or more of: the second external input, one or more additional second outputs produced by one or more additional second components as characterized by the interconnection matrix, the user-defined potential function, and convergence to the steady state condition.

14. The $\Sigma\Delta$ SVM according to claim 13, wherein each first output and each second output encodes information characterizing at least one first or second external input, wherein the information is encoded by at least one output parameter selected from: a mean value and a frequency spectrum.

15. The SVM according to claim 14, wherein the information encoded by at least one output parameter varies as a function of a proximity to a margin of separation of a classification boundary produced by the ΣΔ SVM.

16. A spiking SVM comprising a growth transform neural network system, the growth transform neural network system comprising a computing device, the computing device comprising at least one processor and a memory storing a plurality of modules, each module comprising instructions executable on the at least one processor, the plurality of modules comprising:

a growth transform neural network module to define a plurality of mirrored neuron pairs comprising a plurality of first components and a plurality of second components interconnected according to an interconnection matrix, wherein each of the plurality of mirrored neuron pairs is associated with internal normalized variables p+ and p− that satisfy a normalization criterion of p++p−=1;

a growth transform module to update each first component of each mirrored neuron pair of a plurality of mirrored neuron pairs according to a growth transform neuron model; and a network convergence module to converge the plurality of mirrored neuron pairs to a steady state condition by solving a system objective function subject to at least one normalization constraint, wherein the first component and the second component of each mirrored neuron pair in the steady state condition each produce a neuron response comprising a steady state value or a limit cycle with spiking according to a user-defined potential function $\Phi(p_{ik})$ given by:

$W + |p_{ik} - (½ - \in)|$ for $0 \leq p_{ik} < ½ - \in$ $W|p_{ik} - ½|$ for $½ - \in \leq p_{ik} \leq ½ + \in$, and $W + |p_{ik} - (½ + \in)|$ for $½ + \in < p_{ik} \leq 1$, wherein:

$P_{ik}$ is the response of ith neuron of the plurality of mirrored neuron pairs, k is 1 or 2, W>1 and $\in$>0;

wherein the growth transform neuron model is mutually coupled with a network objective function of a machine learning model; and wherein the plurality of modules are trained to cooperatively classify data input to the spiking SVM and to output a result of the classifying.

17. The spiking SVM according to claim 16, wherein solving the system objective function comprises minimizing a dual-cost function.

18. The spiking SVM according to claim 16, wherein the growth transform neuron model is a polynomial growth transform with a normalization constraint.

19. The spiking SVM according to claim 16, wherein:

each first component of each mirrored neuron pair is configured to receive a first external input and to produce a first output based on one or more of: the first external input, one or more additional first outputs produced by one or more additional first components as characterized by the interconnection matrix, convergence to the steady state condition, the user-defined potential function, and an update according to the growth transform model; and each second component of each mirrored neuron pair is configured to receive a second external input and to produce a second output based on one or more of: the second external input, one or more additional second outputs produced by one or more additional second components as characterized by the interconnection matrix, the user-defined potential function, and convergence to the steady state condition.

20. The spiking SVM according to claim 16, wherein each first output and each second output encodes information characterizing at least one first or second external input, wherein the information is encoded by at least one output parameter selected from: a spiking rate and a time-to-first-spike, and wherein the information encoded by at least one output parameter varies as a function of a value of W in the potential function or as a function of a proximity to a margin of separation of a classification boundary produced by the spiking SVM.

* * * * *